(12) United States Patent
DeMik et al.

(10) Patent No.: US 10,691,398 B2
(45) Date of Patent: Jun. 23, 2020

(54) CONNECTED CLASSROOM

(71) Applicant: Accenture Global Services Limited, Dublin (IE)

(72) Inventors: Lisa Kay DeMik, Fairfax, VA (US); Samir Desai, Rolling Meadows, IL (US); Kishore Prabhakar Durg, Bangalore (IN); Srinivas Govindaiah, Bangalore (IN); James Allen Glore, Batavia, IL (US); Niraj Gupta, Bangalore (IN); William Alfred Jindrich, Jr., Aurora, IN (US); Bryan Michael McCart, Elburn, IL (US); Parag Pande, Noida (IN); Damien X. Panketh, Euless, TX (US); David Petricca, Mount Prospect, IL (US); Nobby Rajan, Bangalore (IN); Syed Sibgathulla, Bangalore (IN); Surendra Sheshagiri, Bangalore (IL); Gordon Trujillo, Brighton, CO (US); Alex Zorba, Madison, CT (US); James Woodier, Gilbert, AZ (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 254 days.

(21) Appl. No.: 14/838,135

(22) Filed: Aug. 27, 2015

(65) Prior Publication Data
US 2016/0092153 A1    Mar. 31, 2016

(30) Foreign Application Priority Data
Sep. 30, 2014 (IN) ............................ 4917/CHE/2014

(51) Int. Cl.
*G06F 3/14* (2006.01)
*G09B 5/10* (2006.01)
(Continued)

(52) U.S. Cl.
CPC .......... *G06F 3/1454* (2013.01); *G06F 3/1423* (2013.01); *G06F 3/1431* (2013.01);
(Continued)

(58) Field of Classification Search
None
See application file for complete search history.

(56) References Cited

U.S. PATENT DOCUMENTS 4,785,472 A * 11/1988 Shapiro .................... G09B 7/04
348/14.01
5,850,250 A * 12/1998 Konopka ................. H04N 7/15
348/14.07
(Continued)

OTHER PUBLICATIONS

Patent Examination Report No. 2, AU Patent App. No. 2015218560, dated Jan. 20, 2017, pp. 1-5, Australia.
(Continued)

*Primary Examiner* — Eddy Saint-Vil
*Assistant Examiner* — William D Ermlick
(74) *Attorney, Agent, or Firm* — Brinks Gilson & Lione

(57) ABSTRACT

A connected classroom system provides for local and remote control and display of media streams. An instructor may, for instance, direct audio/video streams of the instructor to any number of displays and speakers located within a classroom. The system may send and receive control instructions to and from remote classrooms as well, through a network interface. The control instructions may configure any set of presentation devices in any classroom to reproduce any content originating from any source within any classroom. Accordingly, multiple classrooms located in disparate locations may participate in media exchanges arising from any source, including instructors and individual student seating locations within the classrooms.

20 Claims, 17 Drawing Sheets

(51) Int. Cl.
*H04L 29/06* (2006.01)
*G09B 5/12* (2006.01)
*H04N 5/268* (2006.01)
*H04L 12/18* (2006.01)
*H04N 7/18* (2006.01)
*H04N 7/14* (2006.01)
*H04N 7/15* (2006.01)

(52) U.S. Cl.
CPC .......... *G06F 3/1462* (2013.01); *G09B 5/10* (2013.01); *G09B 5/12* (2013.01); *H04L 12/18* (2013.01); *H04L 12/1822* (2013.01); *H04N 5/268* (2013.01); *H04N 7/142* (2013.01); *H04N 7/15* (2013.01); *H04N 7/18* (2013.01); *G09G 2360/04* (2013.01); *G09G 2370/12* (2013.01); *H04L 65/4007* (2013.01)

(56) References Cited

U.S. PATENT DOCUMENTS

| | | | | |
|---|---|---|---|---|
| 6,155,840 A * | 12/2000 | Sallette | G09B 7/02 | 434/323 |
| 6,288,753 B1 * | 9/2001 | DeNicola | G09B 5/06 | 348/14.01 |
| 7,057,636 B1 * | 6/2006 | Cohen-Solal | G01S 3/7864 | 348/14.08 |
| 7,289,112 B2 * | 10/2007 | Yokoyama | G06F 3/03545 | 345/156 |
| 7,454,708 B2 * | 11/2008 | O'Neal | G06F 3/0481 | 715/730 |
| 8,435,038 B2 * | 5/2013 | Wilson | G09B 5/06 | 434/219 |
| 8,456,503 B2 * | 6/2013 | Hoelsæter | H04N 7/18 | 348/14.01 |
| 8,831,505 B1 * | 9/2014 | Seshadri | G09B 5/06 | 348/211.11 |
| 2002/0132216 A1 * | 9/2002 | Dohrmann | G09B 5/00 | 434/362 |
| 2006/0005136 A1 * | 1/2006 | Wallick | H04M 9/082 | 715/726 |
| 2006/0228692 A1 * | 10/2006 | Seshadri | G09B 5/065 | 434/365 |
| 2007/0009015 A1 * | 1/2007 | Kunii | H04L 1/0002 | 375/219 |
| 2007/0030984 A1 * | 2/2007 | Gotfried | H04N 7/147 | 381/122 |
| 2008/0037802 A1 * | 2/2008 | Posa | H04M 1/6033 | 381/77 |
| 2009/0132925 A1 * | 5/2009 | Koehler | G09B 5/10 | 715/730 |
| 2009/0189977 A1 * | 7/2009 | Delia | G06Q 10/06 | 348/61 |
| 2010/0075287 A1 * | 3/2010 | Dohrmann | G09B 5/00 | 434/309 |
| 2010/0279266 A1 * | 11/2010 | Laine | G06Q 10/10 | 434/350 |
| 2011/0050842 A1 * | 3/2011 | Saleh | G09B 5/06 | 348/14.08 |
| 2011/0283008 A1 * | 11/2011 | Smelyansky | G09B 5/065 | 709/231 |
| 2012/0171656 A1 * | 7/2012 | Shen | G09B 5/14 | 434/365 |
| 2012/0182384 A1 * | 7/2012 | Anderson | H04L 12/1827 | 348/14.09 |
| 2013/0314421 A1 * | 11/2013 | Kim | G09B 5/065 | 345/427 |
| 2014/0051054 A1 * | 2/2014 | Wong | H04N 21/25866 | 434/350 |
| 2014/0111600 A1 * | 4/2014 | Schaefer | H04N 5/232 | 348/14.08 |
| 2015/0062284 A1 * | 3/2015 | Rangan | H04N 7/15 | 348/14.08 |
| 2015/0304366 A1 * | 10/2015 | Bader-Natal | H04L 65/1096 | 348/14.03 |
| 2016/0073059 A1 * | 3/2016 | Bader-Natal | H04N 7/15 | 348/14.03 |
| 2016/0255126 A1 * | 9/2016 | Sarris | H04L 65/1096 | 348/14.08 |

OTHER PUBLICATIONS

Patent Examination Report No. 3, AU Patent App. No. 2015218560, dated May 25, 2017, pp. 1-2, Australia.
Patent Examination Report No. 1, AU Patent App. No. 2015218560, dated Aug. 26, 2016, pp. 1-5, Australia.

* cited by examiner

ACLC VGA+Audio Connectivity

ACLC HDMI Connectivity

CONNECTED CLASSROOM

RELATED APPLICATIONS

The present patent document claims the benefit of priority to India provisional Patent Application No. 4917/CHE/2014, filed in the Indian Patent Office on Sep. 30, 2014, and titled "Connected Classroom," the content of which is incorporated herein by reference in its entirety.

TECHNICAL FIELD

This disclosure relates to a system for facilitating engaging and collaborative instruction sessions.

BACKGROUND

Advances in computer and communication technologies have changed how people can communicate, and has both necessitated and facilitated a change in how people communicate and how information and instruction is delivered. Instruction tools have emerged allowing users across the world to connect with one another. Traditional instruction tools like webinars and virtual instructors are used with the intent of pushing content out to users, and typically provide a one directional communication process between an instructor and participant. As technological advances have challenged traditional notions of the classroom setting, given that people may interact globally, a need exists for an instructive platform that provides the ability for an engaging and collaborative classroom environment.

DETAILED DESCRIPTION

Figure 1:
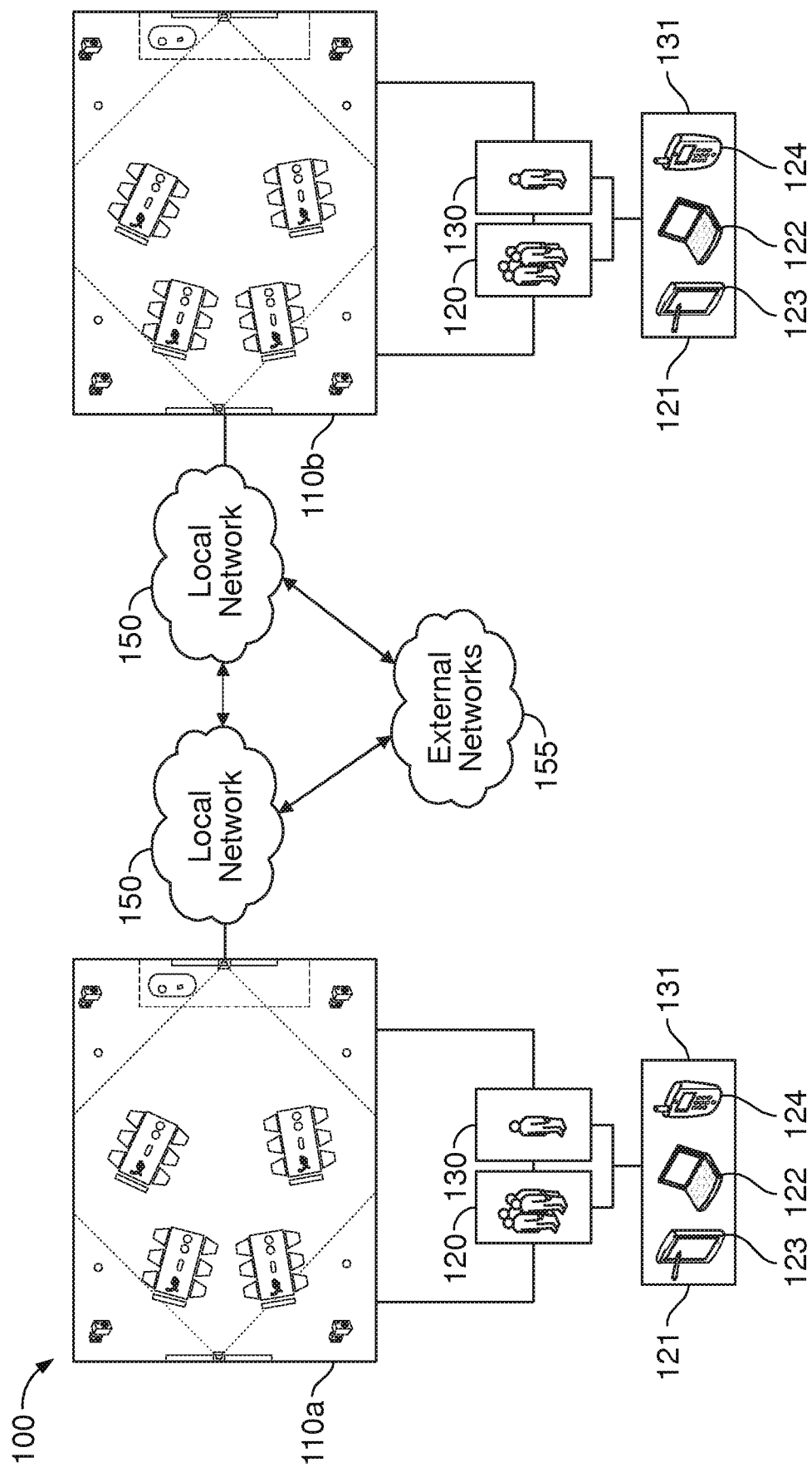
FIG. 1 provides an example of the environment in which the connected classroom system may be deployed.

FIG. 1 provides an example of the environment in which the connected classroom system 100 may be deployed. At a high level, the system 100 may include one or more classrooms 110, each having one or more participants 120 and/or instructors 130. The participants 120 and instructors 130 may have one or more participant devices 121 and instructor devices 131 that they may use to interact with the system. The participants 120 and instructors 130 may engage the system 100, for example, through laptops 122, tablets 123, or smart phones 124, which may provide for bidirectional communication with the system, and may provide, for example and without limitation, a device display, a device interface, a device camera, and a device microphone.

The classrooms 110 may play different roles, where a classroom may have a local instructor 130 (classroom 110a) or where the instructor 130 is presenting remotely (connected classroom 110b). The system 100 may also allow for the roles of the classroom to be changed at any given moment. For example, an instructive session may include a number of different instructors who may provide instruction from different locations. The remote classrooms 110 may be down the hall, on a different floor, in a different building, down the street or across campus, or in a different city. For example, an instructor 130 at the Chicago location may give a 15 minute introduction (e.g., icebreaker, general introductions) and then hand the presentation off to an instructor 130 at the Paris location for 45 minutes (e.g., lecture and Q&A session), and finish with an instructor 130 in India putting on an interactive workshop session for another 30 minutes. The classrooms 110 may provide internal communication over local networks 150, and may be able to communicate other connected classrooms 110b over external networks 155, which may include the Internet. The classrooms 110 may, for example, transmit video data to one another or different control signals or messages.

The classroom 110 may assume different layouts and include different components, which may individually and collectively facilitate an engaging and collaborative classroom environment. The system 100 may provide an instructive platform facilitating collaboration between participants 120 and instructors 130, who may be at the same or different locations, and allow for an engaging and interactive classroom experience.

Figure 2:
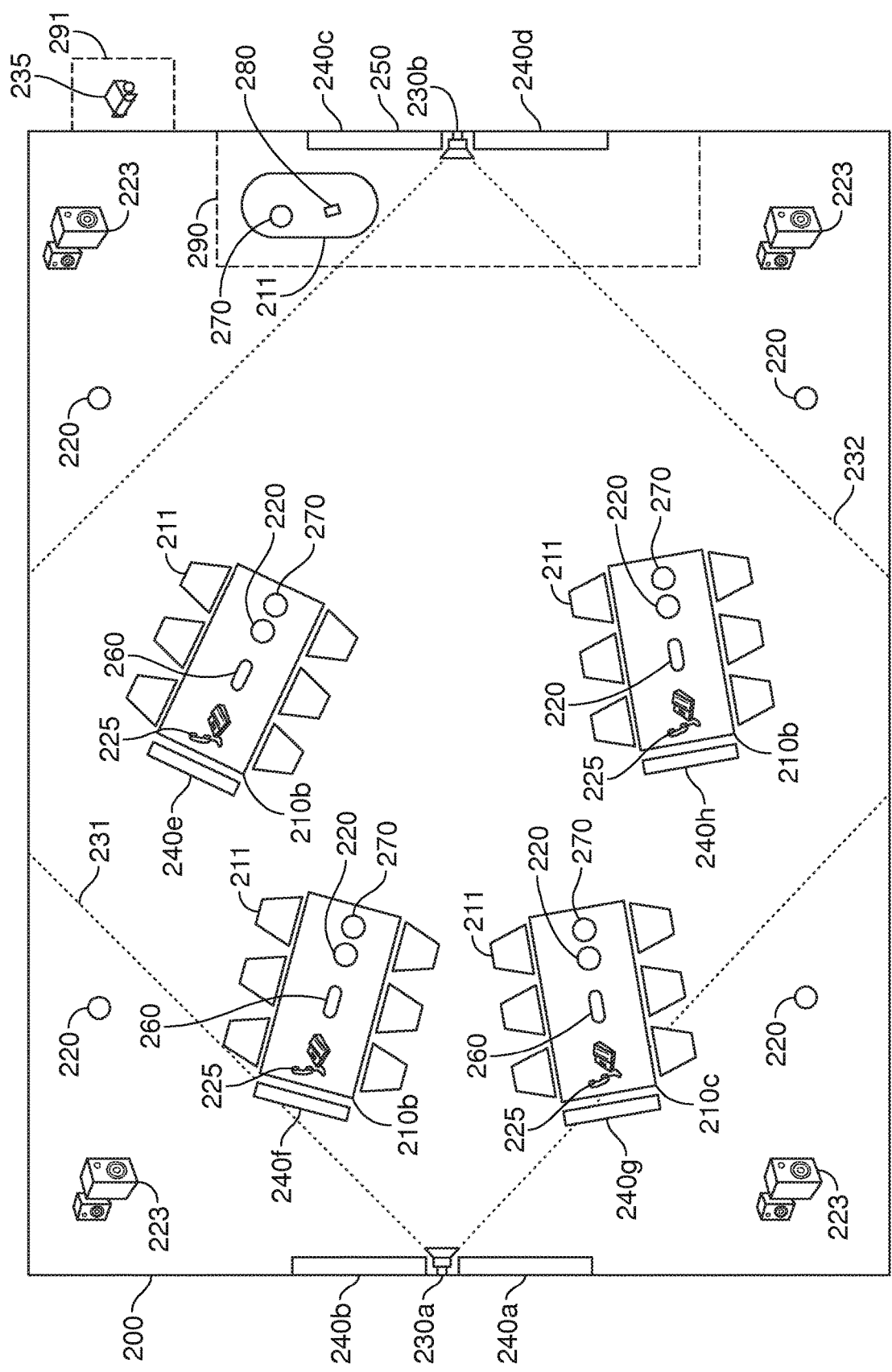
FIG. 2 illustrates an example classroom layout that may be used to facilitate a classroom session.

FIG. 2 provides an example classroom layout 200, where the classroom 110 may include one or more tables 210 and one or more chairs 211 for the participants 120 and instructors 130. The classroom 110 may also include one or more microphones 220, speakers 223, telephones 225, cameras 230, displays 240, digital whiteboards, tablet, desktop, or other types of computers, and any other type of interactive device. The classroom 200 may include various tools through which the instructors 130 and participants 120 may interact. Some classrooms 110, for example, may also include interactive displays 250, collaboration hubs 260, and interactive controls 270, e.g., implemented on a tablet or desktop computer.

Figure 3:
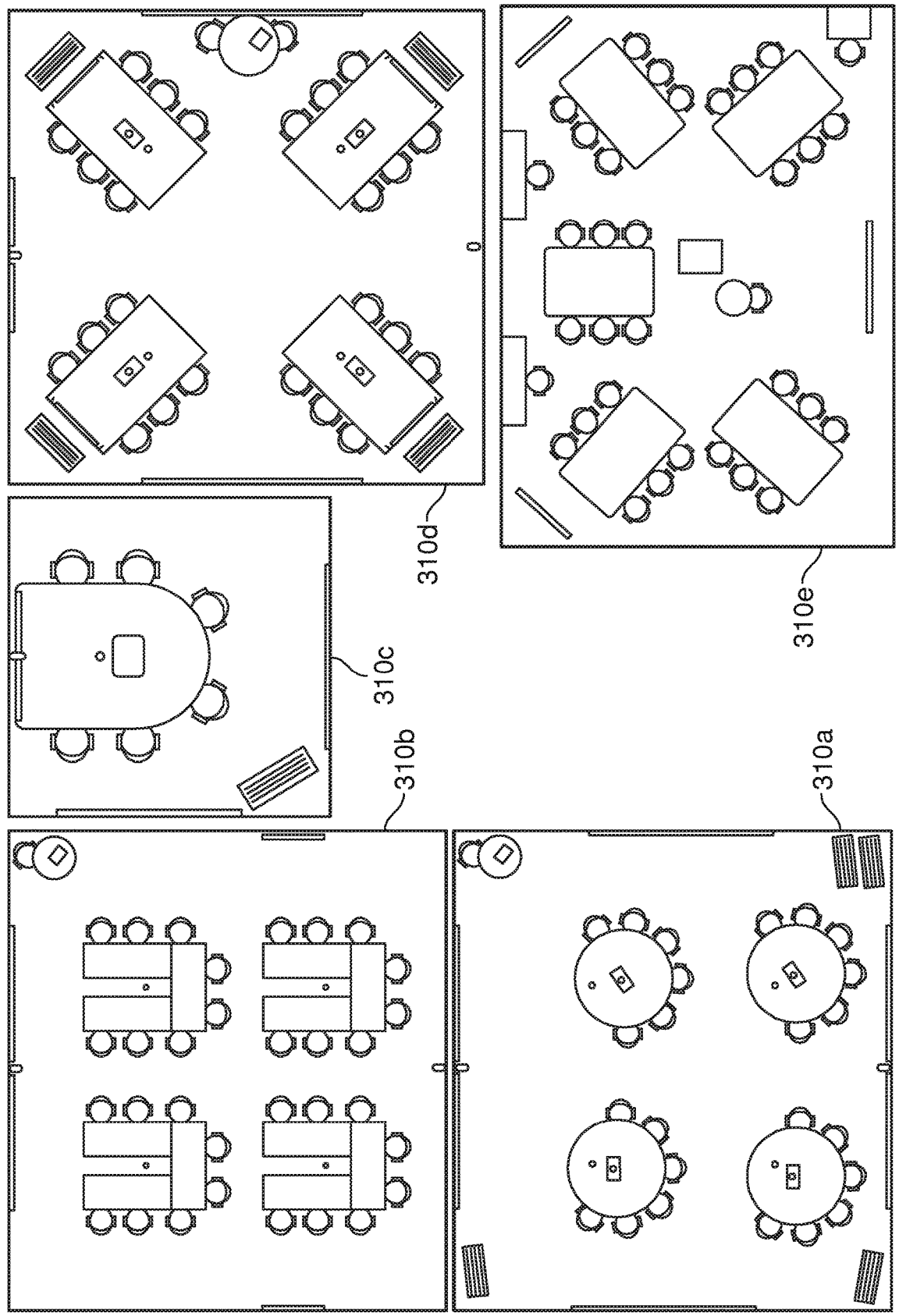
FIG. 3 provides examples of additional layouts that may be used in the connected classroom system.

The system 100 is not limited to the example of FIG. 2, but may assume a variety of different layouts, which may provide different collaborative advantages. FIG. 3 shows additional layouts, including, an 10 layout 310a, an IDC layout 310b, a local office layout 310c, small local office layout 310d, and a triangulated layout 310e. In the triangulated layout 310e, for example, the displays are arranged in a triangle eliminating the traditional "front" of the room concept.

Returning back to FIG. 2, the classroom 110 may include one or more tables 210a-210d at which one or more participants 120 may be situated. The individual tables 210a-210d may allow for participants 120 to be split into sub-groups, and may facilitate collaborative activities within a sub-group. The tables 210 may also be arranged so that participants 120 at the tables 210 are able to view a stage area 290, where the instructor 130 may present from. The classroom 110 may include an instructor table or lectern 211 in or near the staging 290, and could also include a lectern in the center of the classroom where participants 120 could walk up to and speak from. For example, a participant 120, or a sub-group of participants 120, may walk up to the lectern 211 in presenting to the class.

The classroom 110 may also provide for one or more displays 240, which may be positioned throughout the classroom 110 and may serve different functions based on the instructional context. The displays 240, along with the system logic, may display and change content (e.g., audio and video sources) in a coordinated fashion in order to enrich the classroom experience. As noted, the role of the displays 240 may change at any time (e.g., changes in content source), which may occur automatically when certain predefined rules or criteria are met. In other cases, a change in the display 240 role may be manually triggered by the instructor 130 or one of the participants 120.

With reference to FIG. 2, the classroom layout 200 provides for several different displays 240, which may have different attributes (e.g., size, resolution, etc.). The classroom 110, for example, may have a table level display (e.g., 40" LCD display) located at each table 240e-240h, along with large classroom displays (e.g., 85" LCD or Projection displays) located along the walls 240a-240d. The position of the displays 240 may also help to provide an engaging experience. The table level displays 240 may, for example, display the instructor presentation materials, and in some contexts may be disabled, for example, where the instructor 130 hopes to maintain focus by minimizing distractions. Likewise, with reference to FIG. 2, the classroom layout 200 may provide large classroom displays 240a-240d on the wall across from the stage area 240a, 240b and at the stage area 240c, 240d. In an exemplary scenario, screens 240a, 240c may display the same content, for example, the instructor's presentation materials. Screens 240b, 240d, similarly, may both display a video feed from a connected classroom 110b. When presenting from stage area 290, the instructor 130 may look to screens 240a, 240b to verify the presentation materials are properly displayed to the participants 120 and monitor and interact with participants 120 and instructors 130 in other connected classrooms 110b. Since screens 240a, 240b may be within the instructors 130 field of view, the instructor 130 need not look to screens 240b, 240d and, thus, may be able to maintain line of sight with local participants 120. Furthermore, because the content on the displays is mirrored between the screens, the instructor 130 may also be able to look at a common location, for example, when moving about the classroom, and may observe the same information or content.

The displays 240 may also take the form of interactive displays 250 which provide for additional functionality beyond audio and video display functions. The interactive display 250 functionality may be implemented through a software or hardware solution, which may serve to extend the functionality of a display 240. Interactive displays 250 may, for example, allow for real-time annotation, highlighting of content and other illustrative abilities, all of which may be captured and saved for offline distribution. In order to provide a bidirectional real-time interaction, the system 100 may utilize an enterprise communication framework (e.g., Microsoft Lync) for certain underlying functionality. For instance, the system 100 in providing for interactive communication between a local and remote interactive display 250 may utilize the enterprise communication framework to transmit local user activity for remote display. The communication framework may provide for varying quality of service levels which may allow the system to provide for real-time interaction. One example of a commercial available interactive display 250 that may be able to perform the above mentioned functions is Polyvision Eno One Whiteboard.

In some classroom layouts 200, the instructor 130 may be able to leverage the interactive displays 250 to augment a presentation. For example, screen 240a may be an interactive display 250, and the instructor 130 may be able to use the display 250 to illustrate a concept described in the presentation materials. In other layouts, the table level displays 240e-240h may be interactive displays 250, allowing for table level interaction and collaboration that can be captured and shared through the system 100. The system 100 may use interactive displays 250 to support collaborative editing or content creation, for example, in a brainstorming session.

As mentioned above, the classroom 110 may include microphones 220, which may be positioned at different locations within the classroom. For example, microphones 220 may be provided at the tables 210a-210d. Additionally, or alternatively, the classroom 110 may include microphones 220 secured to the ceiling or provide a wireless microphone 220 to the instructor 130. The microphones 220 may, individually and/or collectively, be used to capture dialogue throughout the room, and may be selectively enabled and disabled. For example, the instructor 130 and/or system may activate a table microphone 220 when a participant 130 asks a question. In other situations, like an open classroom discussion, the system logic may activate all of the microphones 220 in the classroom.

The classroom layout 200 may also place cameras 230 at different positions in the room, which may capture different perspectives of the classroom experience. The field of view 231, 232 of the cameras 230 may not be fixed and may be adjusted, depending on the instructive scenario, for example, the camera may be able to pan in the horizontal or vertical directions as well as "zoom" in and out. The camera 230b may, for example, zoom in a participant when they are asking a question or otherwise interacting with the classroom.

While a pair of cameras 230 is illustrated in FIG. 2, the system 100 may include several cameras 230 which may further facilitate the learning experience. Additional cameras may, for example, allow the system 100 to account for the nominal delay associated with adjusting a camera, which may provide for an undisturbed visual experience for the user. For example, in a rapid fire question and answer session, the system 100 may facilitate a queue of sorts and may seamlessly transition between participants 120 in the queue, by orchestrating a handoff between the cameras 230. Any necessary camera 230 adjustments may take place while the other camera 230 is inactive.

The cameras 230 may be utilized in different capacities depending on the instructive context. The cameras 230, along with the system logic, may allow the instructors 130 to teach virtually while maintaining a strong connection with the participants 120. By way of example, as illustrated in FIG. 2, one camera 230a may be placed opposite the stage area 290, and may have a stage field of view 231 directed towards the stage area 290. Another camera 230b may be positioned at the center of the stage area 290 and may have a classroom field of view 232 directed towards the tables 210 and participants 120. One camera 230a may capture the instructor giving the lecture or presentation while another camera 230b focuses on the reaction of the participants 120.

Adjustment of the camera 230 may be assisted by the system 100, which may use a set of pre-determined criteria to determine which camera 230 provides the optimal view, and may facilitate a handoff from one camera to another when the optimal view changes. The system 100 may coordinate cameras 230 across different classrooms 110 to provide a smooth and comfortable collaborative experience. The camera 230 may also automatically track an active participant 120 or instructor 130 in the classroom 110, which may be assisted by location sensing performed by the system 100 and/or assisted by a device located on the instructor 130 or participant 120. An example of a commercially available camera 230 that may, independently or under control of the system 100, be able to perform the above described functionality, is the Cisco PrecisionHD 1080p 12× camera.

In some contexts, the cameras 230 may provide participants 120 with the ability to network across locations. For example, during a break in a classroom session, the cameras 230 and microphones 220 may become active, and the participants 120 may talk to one another from between different locations. Furthermore, cameras 230 from different locations may be bridged together to provide a shared course experience. For example, multiple satellite classrooms 110 may be assembled as a team and may communicate internally over the bridge and/or collectively communicate to the other classrooms.

The classroom 110 may also include one or more video codec (VC) units 235 which may be hidden from view in a concealed storage rack area 291. The VC unit 235 may accept any number of audio or video inputs (e.g., digital cameras 230 and microphones 220) and support multiple output streams, which may facilitate various system 100 functions. The VC unit 235 may be responsible for establishing a connection with a remote VC unit 235, while the system logic may identify what audio and video inputs to select for encoding. The VC unit 235 may also be capable of transcoding and broadcasting the input streams, and may adjust settings (e.g., resolution and/or frame rate) optimized for different network conditions (e.g., bandwidth, latency, etc.). For example, output streams used within the local classroom 110 may be optimized for a higher speed local network, while output streams broadcast to connected classrooms 110b may be optimized for relatively slower networks, e.g., the public Internet. While the VC unit 235 is not limited to transmission over any single network, transmitting the VC unit stream over a private network may provide additional security for the system.

The VC unit 235 may also provide for a programming interface (e.g., through a web API) through which its operation may be controlled. As an example of commercially available technologies, Cisco's TelePresence Codec (e.g., C40 or C90) may support the above described system 100 functionality.

In other instructive settings, the system 100 may provide real-time interaction between participants 120 and instructors 130. For instance, the system 100 may take a live poll of the audience, which may be distributed through the enterprise messaging platform (e.g., Microsoft Lync) to the user devices 121. The system 100 could allow for a question and answer session, where participants 120 both local and remote submit questions, for example, over Lync or through a Web Interface. The system 100 may also be able to determine the location of the participant 120 who submitted the question within the classroom 110, remote or local, and adjust the cameras 230 accordingly.

The classroom layout 200 may provide collaboration hubs 260 at each of the tables, which may allow participants 120 to share content locally, at the table level or classroom level, or system wide. The system 100 may facilitate the sharing of numerous content types including, documents, presentations, hyperlinks, media, or the like. The participants 120 may also share content from participant devices 121 (e.g., share their laptop 121 computer screen). At the table level, the collaboration hubs 260 may facilitate content sharing between participants 120 at the same table (e.g., 210a), and at the classroom level the participants 120 may share content with users at different tables (e.g., 210b-d). The collaboration hub 260 may also provide participants 120 with the ability to connect with instructors 130 and experts outside of the local classroom (e.g., at connected classroom 110b). The collaboration hub 260, with the aid of other system 100 components, may be able to facilitate collaboration and content sharing at different levels simultaneously (e.g., between participants at table 210a and table 210c, and between participants at tables 210b and participants 120 at connected classroom 110b).

Furthermore, as noted above, any display 240 can be extended to become an interactive display 250 through hardware and/or software solutions. The system 100, through the collaboration hub 260, may allow participants 120 at one table (e.g., table 210a) to annotate or otherwise interact with content shared by participants 120 at other tables (e.g., table 210b-210d). Also as mentioned above, the participants 120 may be able to network with participants 120 in other locations and the collaboration hub 260 may be used to augment this networking activity.

The system 100, through the collaboration hub 260, may also allow participants 120 to virtually interact with participants 120 at different tables 210 and different classrooms 110 (e.g., connected classroom 110b) and to solve problems together and/or in a distributed manner. For example, the collaboration hub 260 may allow participants to lead presentations in the classroom 110 (e.g., presenting their solution to a problem presented by the instructor 130), or perform other activities and simulations (e.g., simulating a mock client interview). The collaboration hub 260 may also allow a group of participants 120 tasked with solving a problem to divide the workload having individual participants 120 perform needed tasks in parallel (e.g., perform research on the Internet, prepare a presentation deck, or compile and analyze data in a spreadsheet).

In other instructive contexts, the collaboration hub 260 may allow participants 120 to connect and interface directly with instructors 130, regardless of location. Furthermore, this collaboration may occur at the table or individual participant level. For example, a sub-group of participants 120 (e.g., participants 120 at table 210a) may be able to interact with remotely located (e.g., connected classroom 110b) instructors 130 or experts. In such a scenario, table level displays 240 may display the instructor 130, and web cameras 230 positioned atop the table level displays 240 may provide the remote instructor 130 with a view of the participants 120 at the table. Communication between the participants 120 and instructors 130 may also be aided by enterprise communication software and a speakerphone 233, 235 at the table 210. An example of a commercially available speakerphone 233,235 is the Jabra SPEAK410 USB Speakerphone, which may utilize a USB connection to interface with the collaboration hub 260 directly or indirectly through a participant device 121 or instructor device 130.

The system 100 may be able to adapt various commercially available devices to provide the above described functionality of the collaboration hubs 260. For example, the system may include the Barco ClickShare wireless presentation and collaboration system or Steelcase media:scape.

The system 100 may also utilize various interactive controls 270, which may be provided to individual participants 120 or to a table 210, where it may be shared by several participants 120. The interactive controls 270 provided to the participants 120 may be a physical device or electronic (e.g., provided through a web interface). The system 100, for example, may provide participants 120 with a device having various buttons, which they may use to respond to questions presented by the instructor 130. The interactive controls 270 may provide different inputs to the system, which the system logic may process to provide certain functionality. For example, a table 210 may be provided with a physical button 270 ("look-at-me" button 270) that the participants 120 may press in different contexts. Pressing and releasing the button 270, for example, may cause the system 100 to trigger one event (e.g., pushing the participant's 120 content to the entire classroom 110, including connected classrooms 110b. Pressing and holding the button 270 may trigger a different event. The system 100 may also respond to unique sequences of input from the interactive controls 270, for example, triggering an event when the button is tapped in short succession (e.g., double tap). The system logic may also provide the instructor 130 with a notification that a certain event has been sensed.

The system 100 may also include a control unit 280, which the instructor 130 may use while moving through the classroom 110 and may be docked at the instructor table 210. Through the control unit 280, the instructor 130 may be able to control the learning experience, by coordinating the various system components in the classroom 110. For example, the instructor 130 through the control unit 280 may be able to share content across any of the displays 240, both local and remote (e.g., displays 240 in connected classroom 110b).

The control unit 280 may aggregate control of the various system 100 components into a single device through which technical adjustments may be made. The functionality of the control unit 280 may be facilitated by additional system components and system logic, which may be responsible for certain "behind the scenes" tasks and operations. The control unit 280 may also provide a control interface 281, which may allow the instructor 130 to intuitively control and switch between different teaching modes.

The control unit 280 may provide instructor driven controls to adjust the various components of the system 100. The instructor 130, through the control unit 280, may be able to adjust various settings, for example, where the cameras 230 are pointing (e.g., by panning or zooming a particular camera 230) and corresponding capture settings (e.g., resolution). For example, the control unit 280 may allow the instructor 130 to choose from different views of the stage area 290. These views may include a close-up view of the instructor 130 themselves or a view covering the instructor 130 and interactive display 250.

The control unit 280 may facilitate multiple layers of control, allowing an instructor to use pre-programmed views or manually control the cameras 230. The control unit 280 and control interface 281 may provide pre-programmed scenarios to adjust settings (e.g., camera positions and capture settings). For example, the control unit 280 may have pre-programmed views for each table 210a-210d. The pre-programmed views may provide for a crisper experience (e.g., adjusting pan and zoom simultaneously) as the camera 230 adjustment may be controlled by the system logic, and may not be subject to problems associated with manual control (e.g., over correction, disjointed adjustment of pan and zoom). Furthermore, the control unit 280 may allow an instructor 130 to store additional custom pre-programmed views The control unit 280 may also provide the ability to control the content (e.g., video source) that is presented on displays 240 throughout the classrooms 110, both local 110a and remote 110b. For example, the control unit 280 may be able to select a remote video feed, the video feed from a particular camera 230 (local or remote), or participant 120 content provided through the collaboration hub 260. The control unit 280 may allow individual control of the displays 240 or allow the displays 240 to be controlled in groups (e.g., wall displays 240a-d, or table level displays 240e-h).

The control unit 280 may also provide the instructor with various notifications, allowing participants 120 to provide real-time feedback. For example, the control unit 280 may provide notifications from the enterprise messaging system, including questions submitted by the participants 120 or participant 120 responses to a poll or questionnaire. The control unit 280 may also present feedback from interactive controls 270, including, for example, and indication that a participant 120 has pressed the look-at-me button 270, along with the response that is to be triggered based on the button pressing sequence. The system logic may automatically trigger a response (e.g., automatically push the participant 120 content to all of the screens) to the feedback received from the look-at-me 270 button, or it may provide the instructor 130 with the ability to manually trigger the response or to ignore the request.

The control unit 280 may also allow the instructor 130 control over what functionality is available to participants (e.g., enable or disable certain functionality). For example, in some cases the instructor 130 may want to give an uninterrupted presentation, saving questions for the end, and through the control unit 280 may disable the look-at-me button 270 functionality. In other situations, the instructor 130 through the control unit 280 may be able to enable or disable participant 120 microphones 220, for example, to disable the microphone 220 of a disruptive participant 130 or table 210. The system logic may also use this ability to facilitate collaborative interactions, for example, by implementing a ("Jeopardy" styled) timer, enabling feedback from interactive controls 270 after a certain pre-determined period of time has passed. The system 100 may also let the participants observe when interactive controls 270 are available, for example, providing the active status of the interactive control 270 through a web interface.

The control unit 280 may also allow the instructor 130 to record and capture, in a media database in communication with the system components, all of the above described interactions, at the touch of a button. The system 100, for example, may capture video content passing through the system, content created using an interactive display or whiteboard, and audio content from individual or group discussions. The system 100 may also record different coordination information, including, for example and without limitation, event timing, transitions, and triggers, which may allow for a better orchestrated playback experience.

The AMX Touch Panel is one example of a commercially available control unit 280 that may be adapted to provide the above described control unit 280 functionality.

Figure 4:
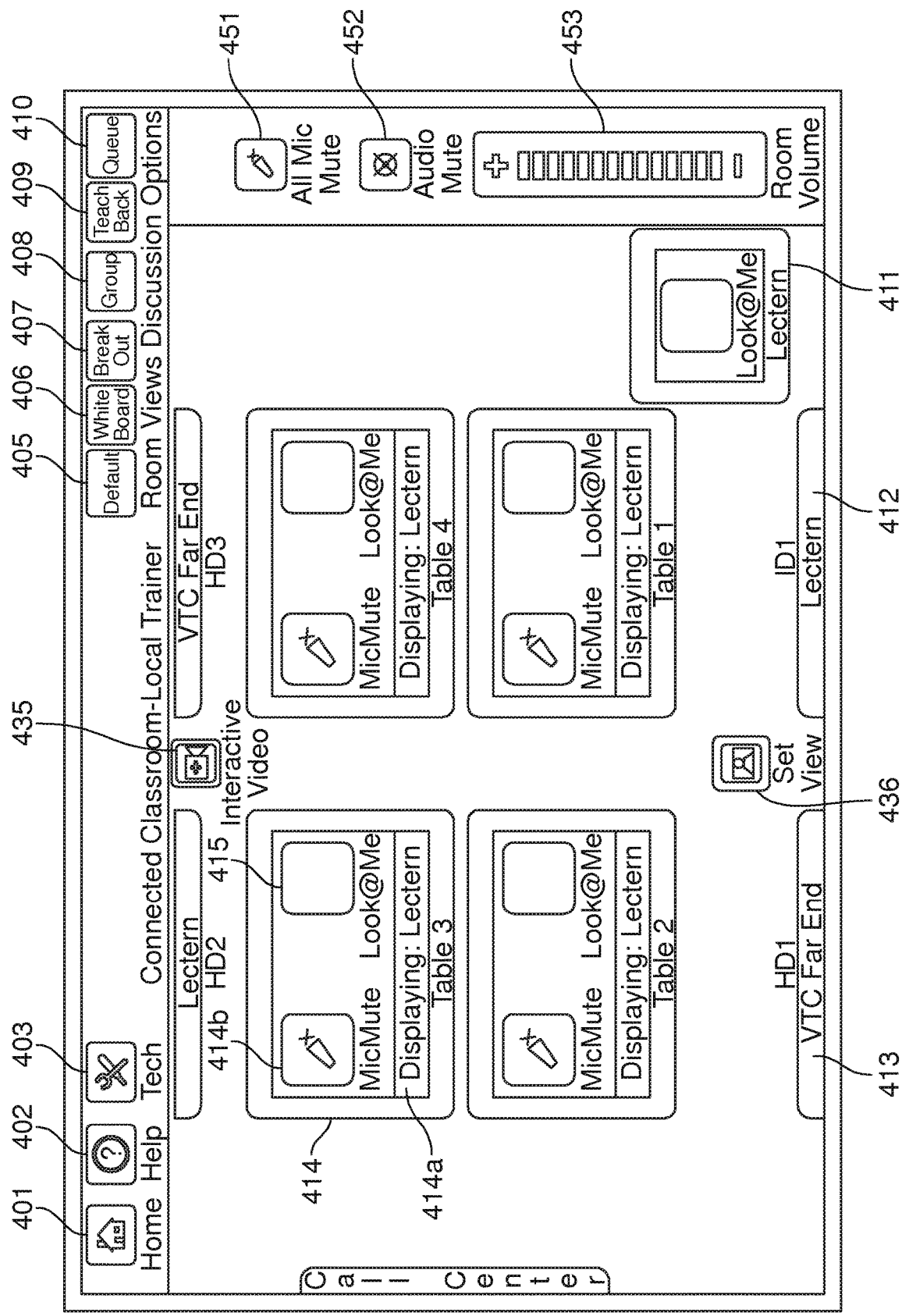
FIG. 4 illustrates an example of a control that may be provided on a control unit.

FIG. 4 provides an example of a control interface 281 that may be provided to an instructor 130 on a control unit 280. The control interface 281 may be presented to an instructor 130 in a local classroom (110a) or a connected classroom (110b). As the classrooms 110 that are local or connected may change at any given moment, so too may the control interface 281 that is presented to the instructor 130.

With reference to FIG. 4, the control interface 281 may provide a series of buttons along the top of the interface, including a home button 401, a help button 402, and a tech button 403. The control interface 281 may also allow for selection of pre-programmed configurations, for example, a default room option 405, a break-out session option 406, and an interactive white board option 407. The control interface 281 may likewise provide a group discussion button 408, a teach-back option 409 and a queue option 410. The control interface 381 may additionally allow for adjustment of the classroom audio, illustrated in a panel on the right of the screen, by providing buttons to mute all microphones 451, mute all audio 452, or to adjust the audio volume 453. The control interface 281 may also provide a main control area corresponding to a classroom layout 200, where information regarding the classroom 110 elements may be presented as an icon, an indicator, an image or button, and/or text. With reference to FIG. 4, the control interface 281 may provide indicators for the lectern 411, interactive display 412, HD displays 413, tables 414, including table level displays 414a and table microphones 414b, interactive controls 415, and camera view options and indicators 435,436. As illustrated, FIG. 4 may represent the default configuration of the room, for example when the default room configuration button 405 is selected or when the system 100 is first initialized. The default room option 405, for example, may be appropriate for leading a presentation to the class.

As illustrated in FIG. 4, in the default configuration 405, the interactive display 250 and HD display 240a may provide lectern content, while the other HD displays 240b, 240d may display video content from the remote connected classroom 110b, for example, received from remote VC unit 235. The camera view indicator 435 may indicate that the camera 230 is capturing the wide angle instructor view, and camera view indicator 436 may indicate that the "self-view" is active, wherein a camera view of the instructor 130 is being displayed as a picture-in-picture on HD display 240b.

With regards to the four tables 210a-210d, the control interface 281, may indicate what content is driven to the table level displays 414a along with the status of the table microphones 414b and interactive controls (e.g., look-at-me button status) 415. As illustrated, for example, the table level displays 240e-h may all show the lectern content, and all of the microphones 220 may be muted. By selecting the microphone indicators 414b, the instructor may be able to activate or deactivate the microphone at the corresponding table 210.

The control interface 281 may facilitate additional system changes based on the selection of different options. For example, if the break out session 406 option is selected, the content provided to table level displays 240e-240h may be changed to show content from participants at the table provided, for example, through collaboration hub 260. The camera view and indicator 435 may remain the same and the microphones may remain muted. As another example, when the white board option is pressed 407 the system 100 may cycle through the different available video sources to provide to interactive display 250. The control interface 281 may also provide the instructor 130 with the option to select from various camera preset selections, create and/or modify user defined presets, or provide for manual camera controls by pressing the camera option button 435. Similarly, pressing the camera indicator 436 may toggle between enabling and disabling the picture-in-picture feature (mentioned above). Similarly, the group discussion indicator 408 may be used to toggle the microphones 220 on or off to facilitate a classroom discussion.

The control interface 281 may also provide indications 415 regarding the different interactive controls 170 in the classroom, and allow the instructor 130 to control this functionality, for example, using the teach back 409 and queue 410 functions. The teach back 409 option may enable processing of input received from the look-at-me devices 415, and may allow participants to lead a teaching discussion back to the class, and the queue 410 option may allow for queueing the received input (e.g., in a rapid fire question and answer session).

The system 100 may process the input of the look-at-me devices 270, when active. For example, when active in the default configuration 405, a short press of the look-at-me device 270 may trigger an adjustment of the cameras 230 based on the location of the triggering look-at-me device 270 and unmuting of the respective table microphone 220. Upon a long button press, the system 100 may additionally push the tables content (e.g., provided through collaboration hub 260) to the VC unit 235 and direct the VC unit 235 to provide the tables content as an output, which the system 100 may then distribute locally and remotely. The system 100 could trigger an entirely different response, based on the interactive control 270 input, when in a break out configuration 406. In either case, the system 100 adjustments may be temporary, and the system 100 may remember the previous state of the system 100 and return to the previous configuration upon an additional press of the look-at-me device 270 or some other condition. Furthermore, the adjustments may take place automatically or may require some sort of validation or approval from the instructor 130 which may be provided through the interactive control indicators 415 of the control interface 281.

Figure 5:
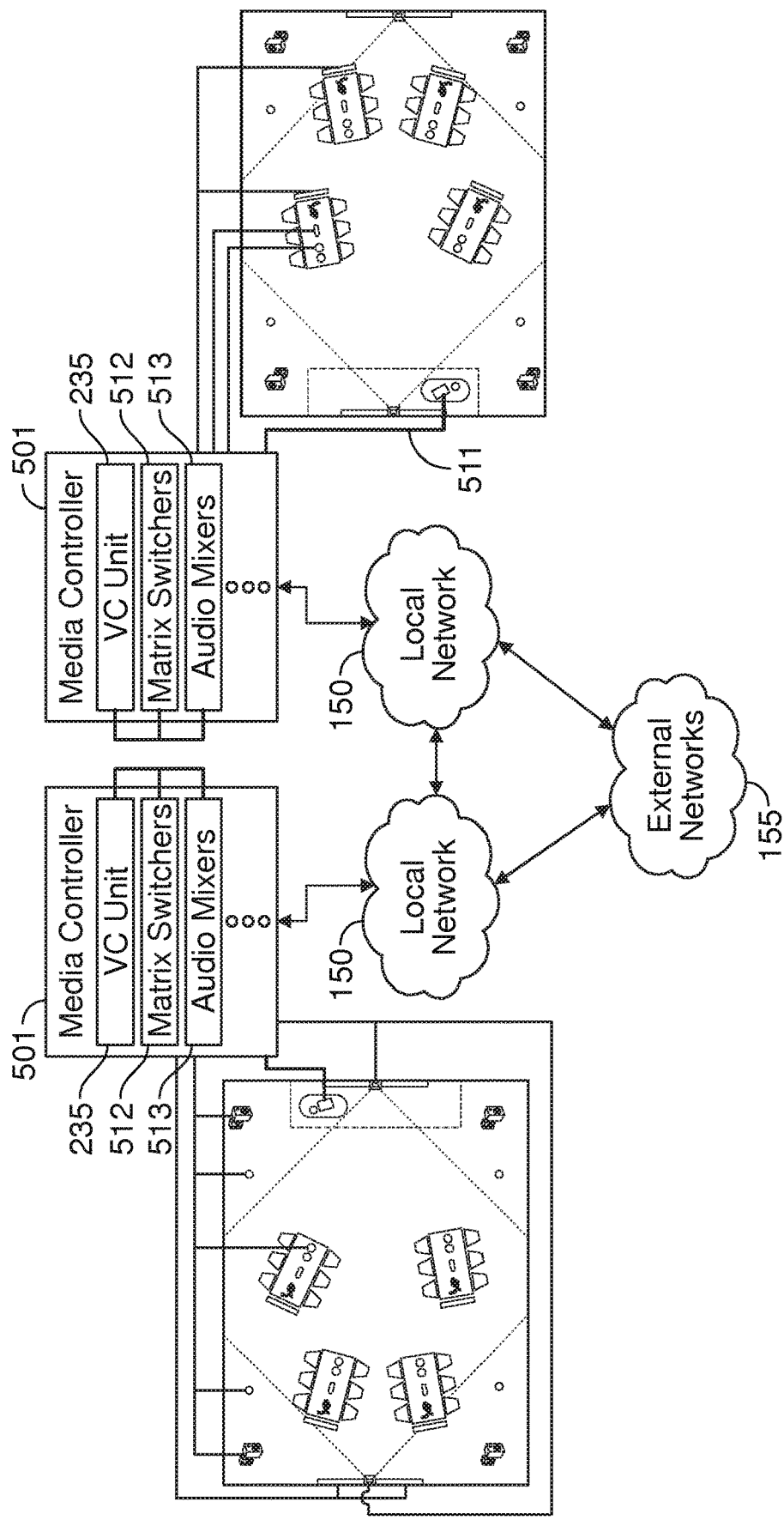
FIG. 5 illustrates a system architecture on which the connected classroom may be implemented.

FIG. 5 provides an example of a high level system architecture 500 on which the connected classroom system may be implemented. The system 100 may include a media controller 501, which may be responsible for controlling the various components of the system 100, including for example, microphones 220, cameras 230, interactive displays 250, and interactive controls 270. The media controller 501 may provide control signals to, and receive state and feedback information from, the control panel 550, over a control bus 511. The controller 501 may be thought to establish a set of control mechanisms by which each of the components are controlled. While the controller may be provided with and perform certain logic, the logic implemented on the controller may depend on the inputs received from the various system components. The AMX device may exchange different directives and coordination requests to the system components over a standard AMX device protocol. For example, the media controller 501 may activate or deactivate the microphones 220 or physically adjust the location of focus of the cameras 230. The media controller 501 may take as inputs various input source data streams, for example, audio input streams from microphones 220, video input streams from cameras 230, and interactive control input data streams from interactive controls 270. The media controller 501 may also provide a series of output data streams (e.g., audio and video), which it may provide to the various other system components (e.g., speakers 323 and displays 240).

The media controller 501 may be used to facilitate different system 100 capabilities, including, for example, adjustment of the cameras 230, switching of audio and video content sent to displays 240 and classroom speakers 223, and processing of input received from interactive controls 270. The media controller 501 may also manage the different VC units 235, for example, changing the input for, and adjusting the encoding settings of, the VC unit 235 (e.g., identifying what data streams to encode and output).

The media controller 501 may also generate content data streams and control channel data streams. The content data stream output by the media controller 501, for example, may be a wide-angle view of the stage area 290, transcoded by the VC unit 235 for transmission by the media controller 501 to the remote connected classrooms 110b. Control panel 280 may provide control messages across control bus 511 to the media controller 501, which may control local classroom devices. The control channel data stream may, for example, provide commands directing a matrix switcher 512 to display particular content on remote displays 240. As another example, the media controller 501 may direct the audio mixer to direct microphone 220 input streams as output streams to classroom speakers 223.

The media controller 501 may also transmit commands to connected classrooms 110b, which may in turn be processed by remote media controllers 501 to control remote classroom devices. In a rapid fire question and answer session, for example, the media controller 501 may exchange commands with connected classrooms 110b to coordinate the adjustment of remote cameras 230 and encoding by remote VC unit 235 so as to provide a seamless video change between participants 120 in different classrooms 110.

The media controller 501 may be a single component or several components (e.g., VC unit 235, matrix switches 512, audio mixer 513) that may collectively implement the system logic of the media controller 501. FIGS. 6-12 illustrate different examples of devices that may be used in forming a media controller 501, including different integrated controllers, matrix video switches, HDMI video switches audio mixers, and user control devices.

Figure 11:
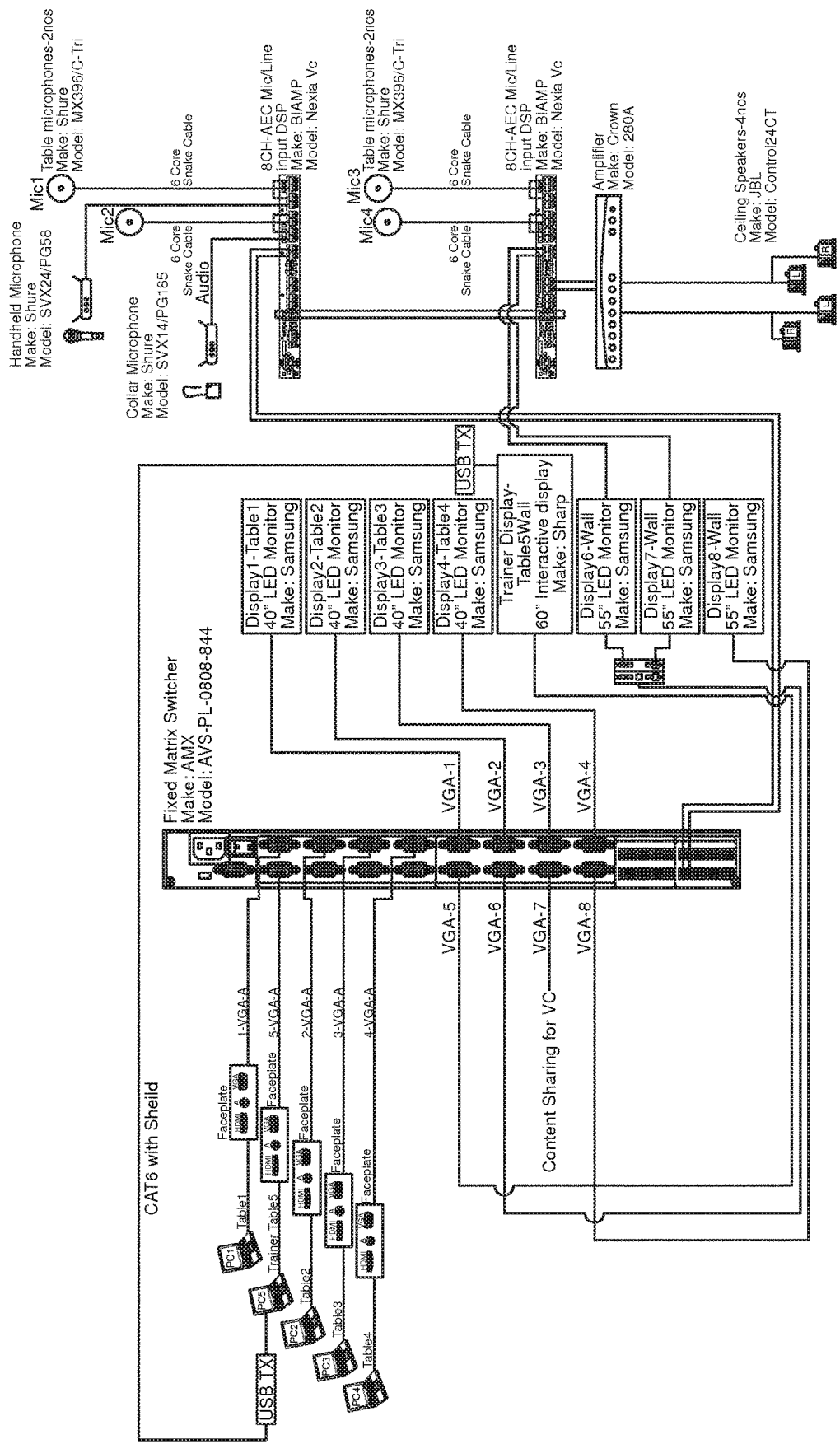
FIG. 11 illustrates another example of the various system components and connections that may be used in a connected classroom.
Figure 12:
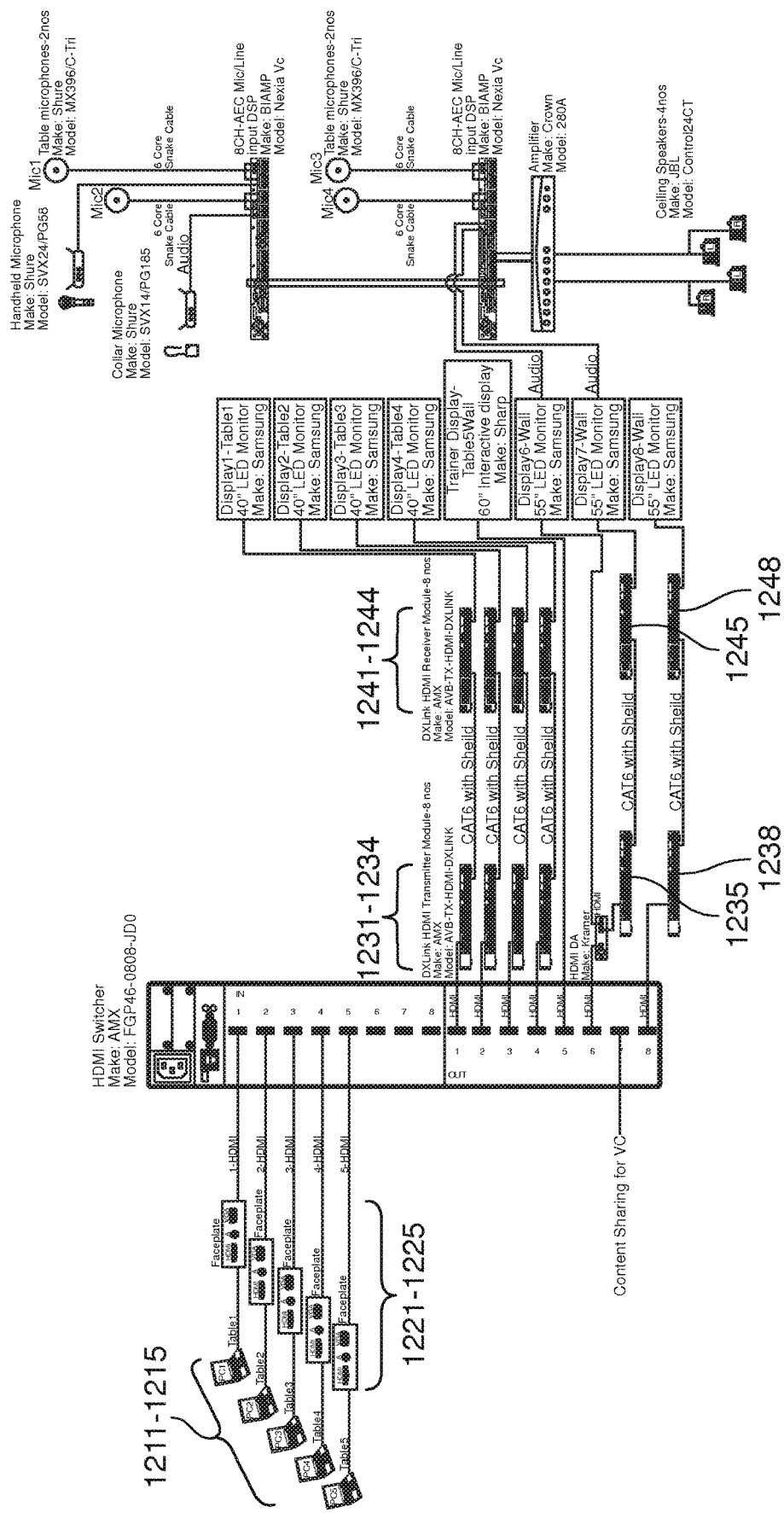
FIG. 12 illustrates another example of the various system components and connections that may be used in a connected classroom.
Figure 12A:
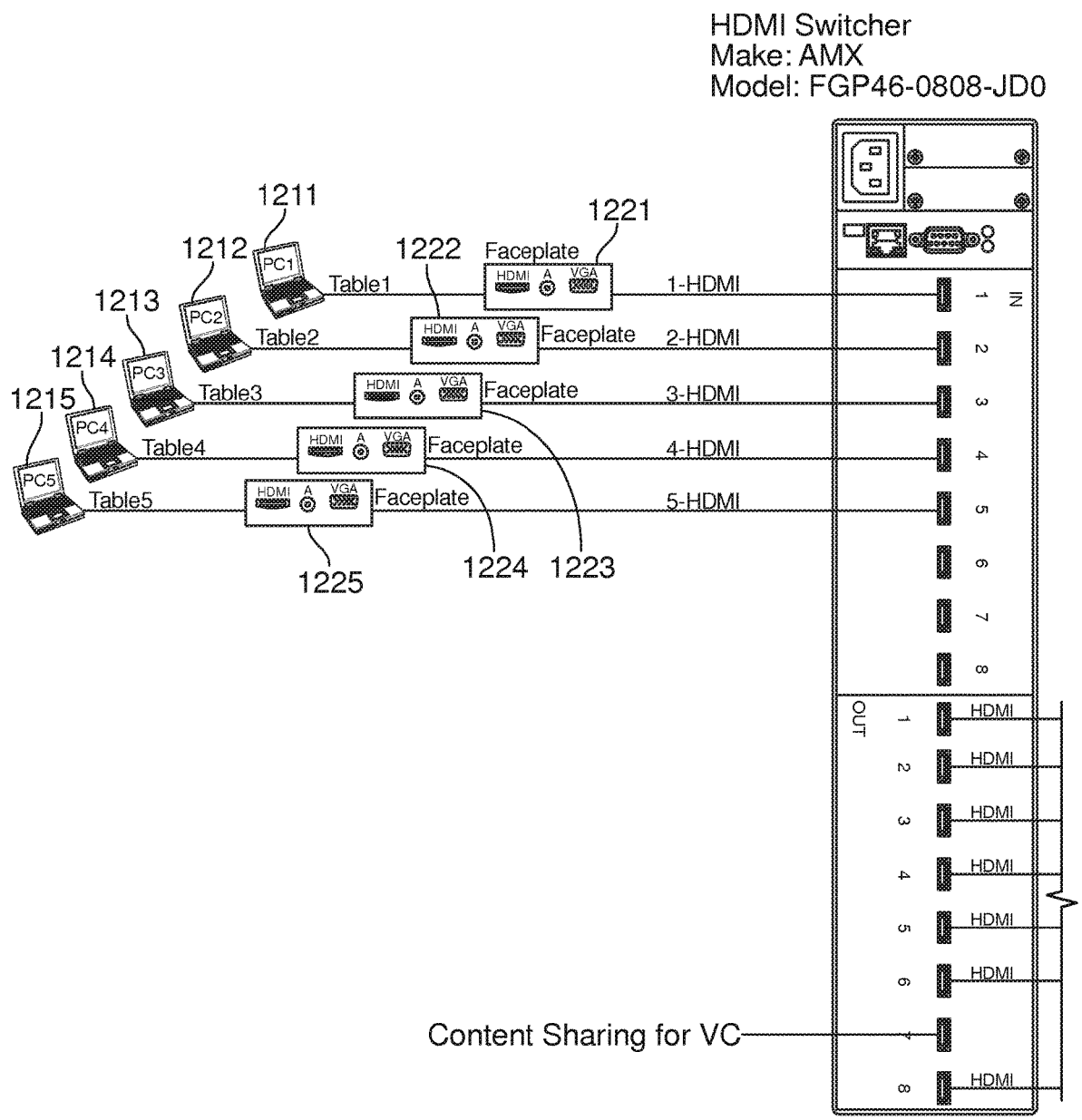
FIG. 12A illustrates another example of the various system components and connections that may be used in a connected classroom.
Figure 12B:
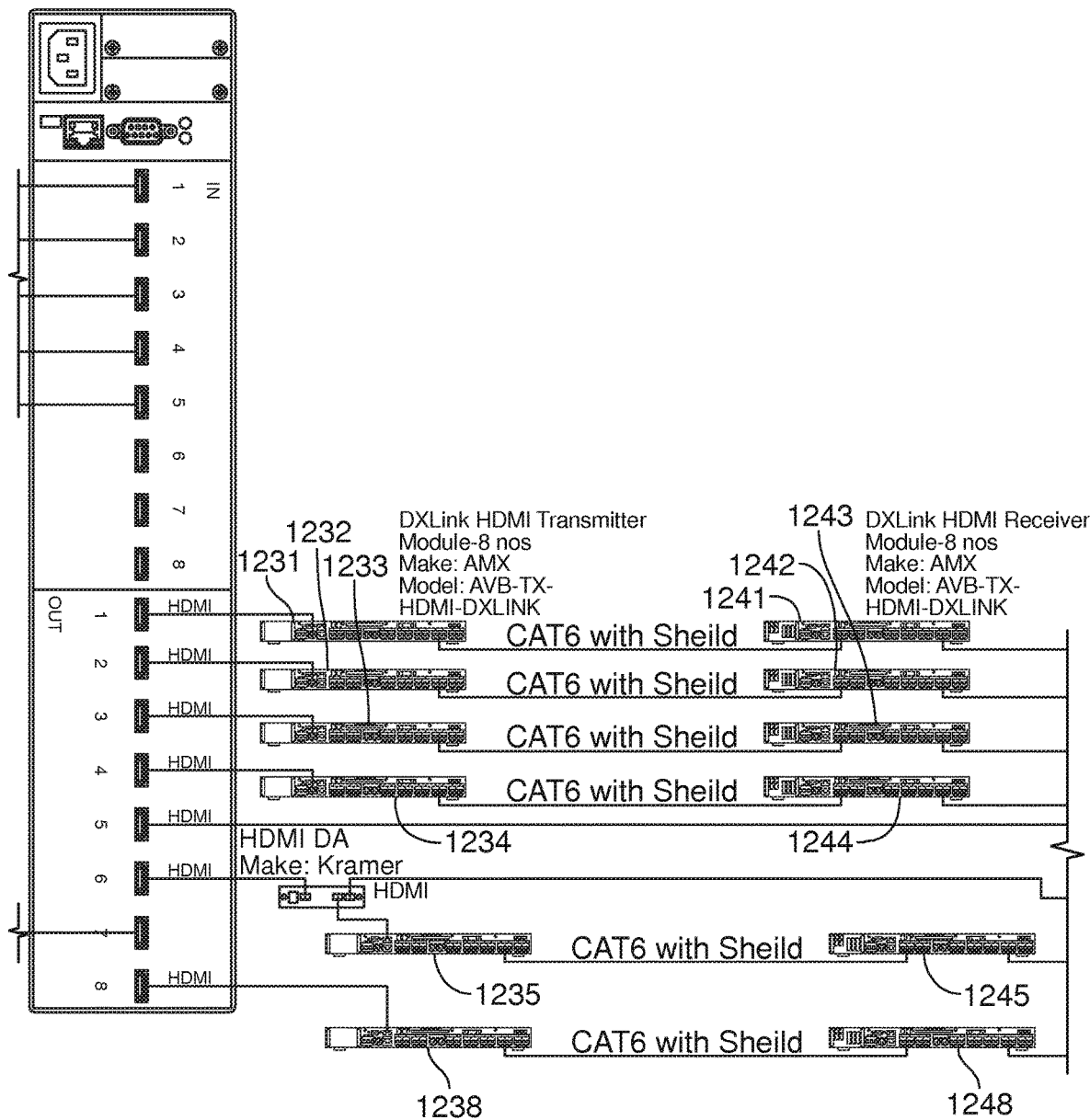
FIG. 12B illustrates another example of the various system components and connections that may be used in a connected classroom.
Figure 12C:
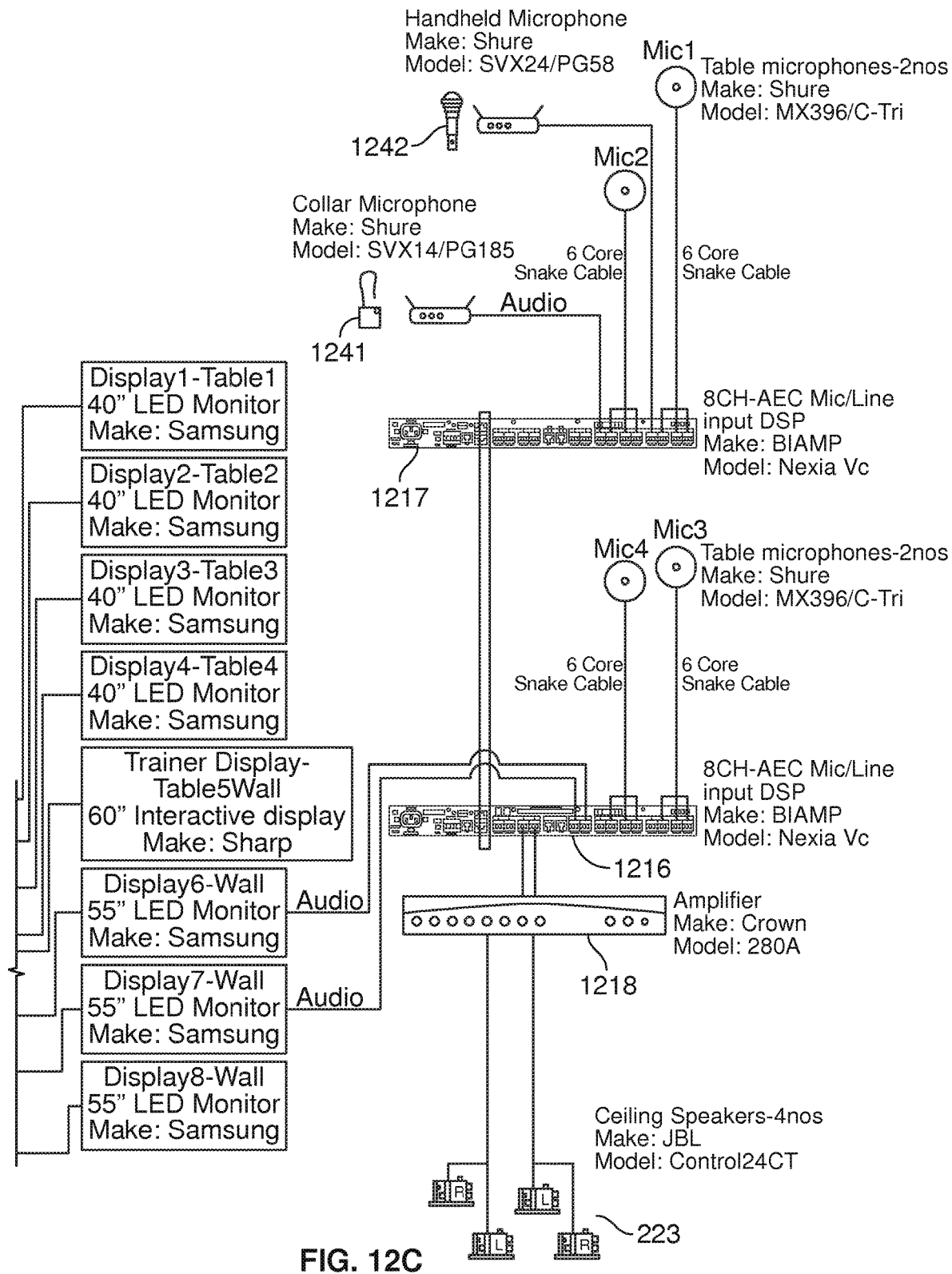
FIG. 12C illustrates another example of the various system components and connections that may be used in a connected classroom.

FIGS. 6-12 illustrate examples of the various system components and connections that may be used in a connected classroom. FIGS. 6a and 6b along with FIGS. 12a, 12b and 12c illustrate portions of FIG. 6 and FIG. 12 in larger scale.

Figure 6:
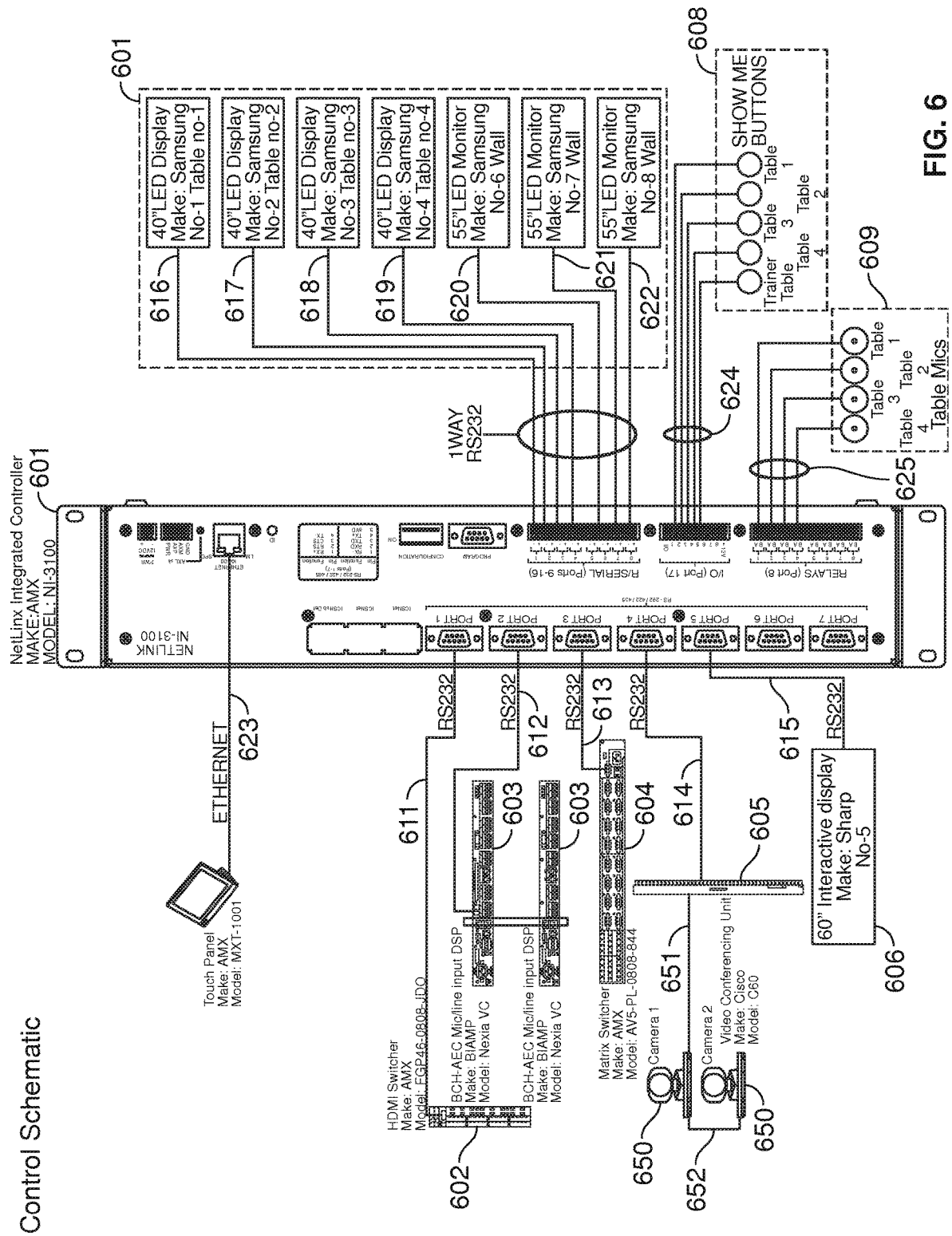
FIG. 6 illustrates an example of the various system components and connections that may be used in a connected classroom.
Figure 6A:
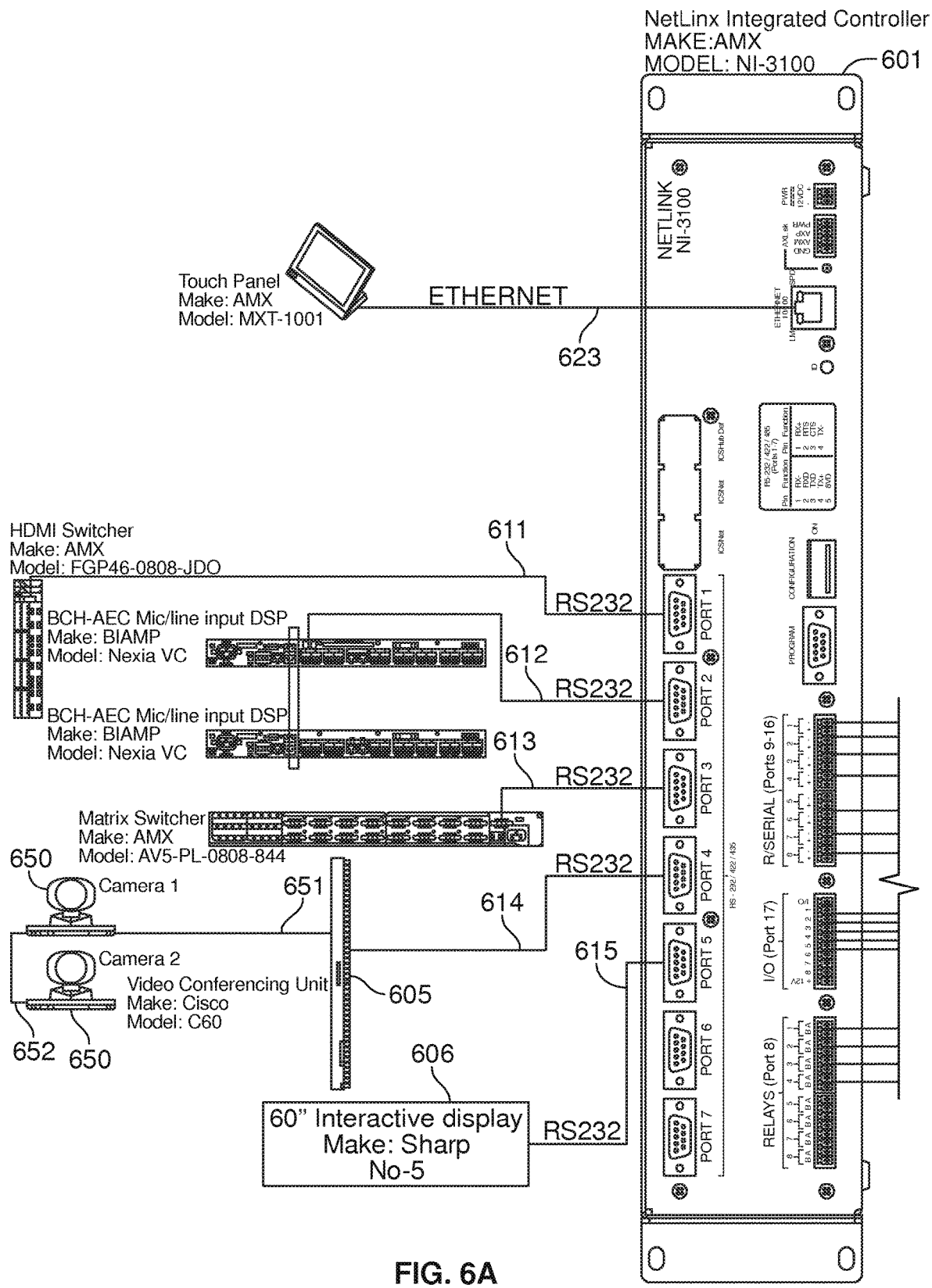
FIG. 6A illustrates another example of the various system components and connections that may be used in a connected classroom.
Figure 6B:
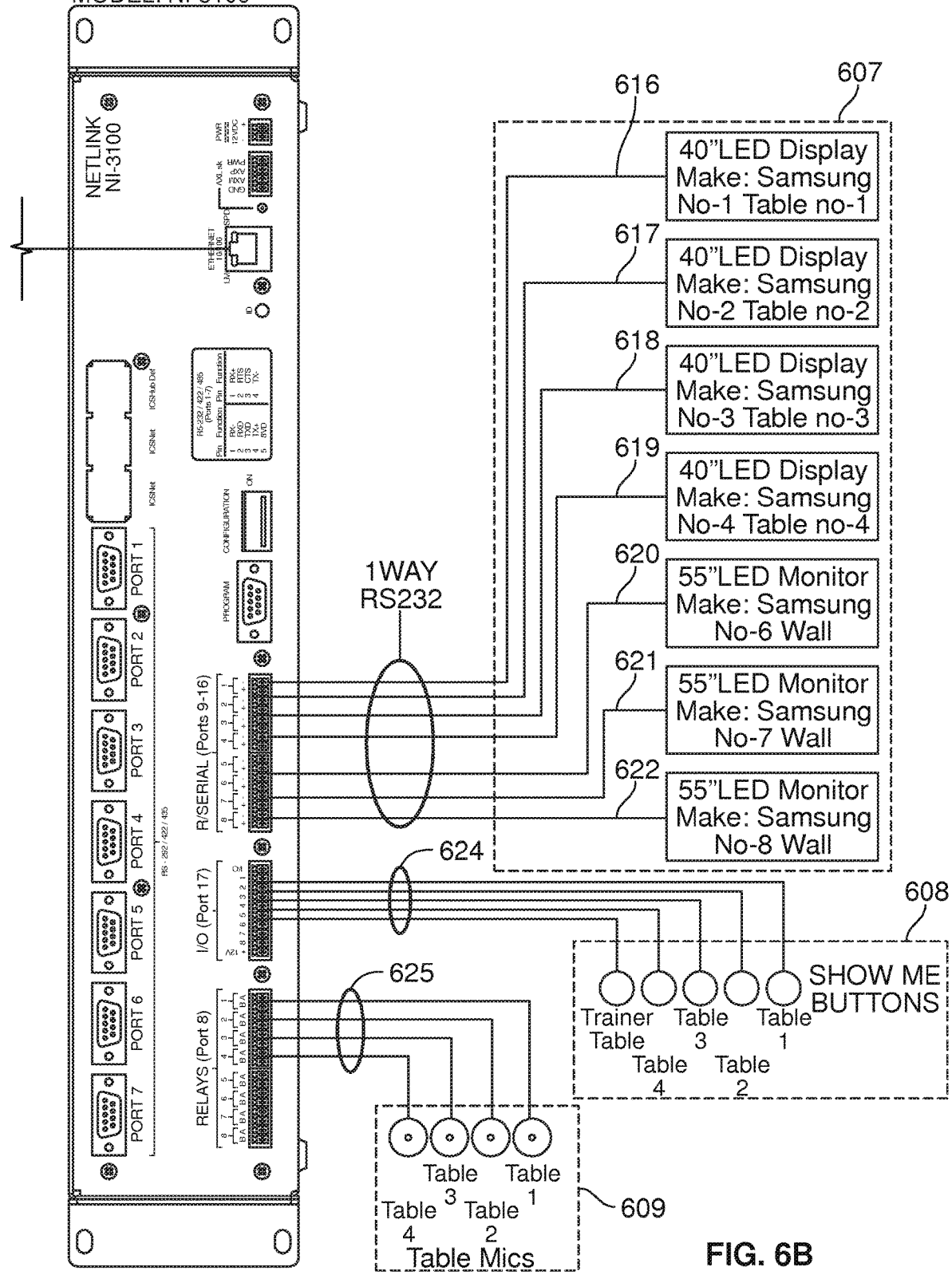
FIG. 6B illustrates another example of the various system components and connections that may be used in a connected classroom.

FIG. 6 illustrates an integrated controller 601 in connection with an HDMI switch 602, a pair of AEC audio mixers 603, a matrix video switch 604, a VC unit 605, various displays 607 and interactive displays 606, interactive controls 608 ("show me" buttons), table microphones 609, and a control panel 610. As examples of commercially available devices, the integrated controller 601 may be NetLinx Integrated Controller NI-3100 offered by AMX, the HDMI switch 602 may be an FGP-46-0808-JD0 also offered by AMX, the matrix video switch 604 may be the AVS-PL-0808-00P by AMX, and the VC unit 605 may be the C60 Cisco TelePresence Codec. The audio mixers 603 may be Nexia VC mixers offered by Biamp, and the control panel 610 may be an AMX MXT-1001 touch panel.

The integrated controller 601 may be in two-way communication, over RS232 connections 611-615, with the HDMI switcher 602, the pair of AEC audio mixers 603, the matrix video switcher 604, the VC unit 605, and interactive display 606. The integrated controller 601 may communicate with displays 607 over one-directional RS232 connections 616-622, and may communicate with the control panel 609 over an Ethernet connection 623. The interactive controls 607 and table microphones 608 may be analog or digital inputs provided over connections 624, 625. The VC unit 605 may communicate, over an RJ45 to RS232 connection 651, with cameras 650, which may inter-communicate amongst themselves over RJ45 Ethernet connections 652.

Figure 8:
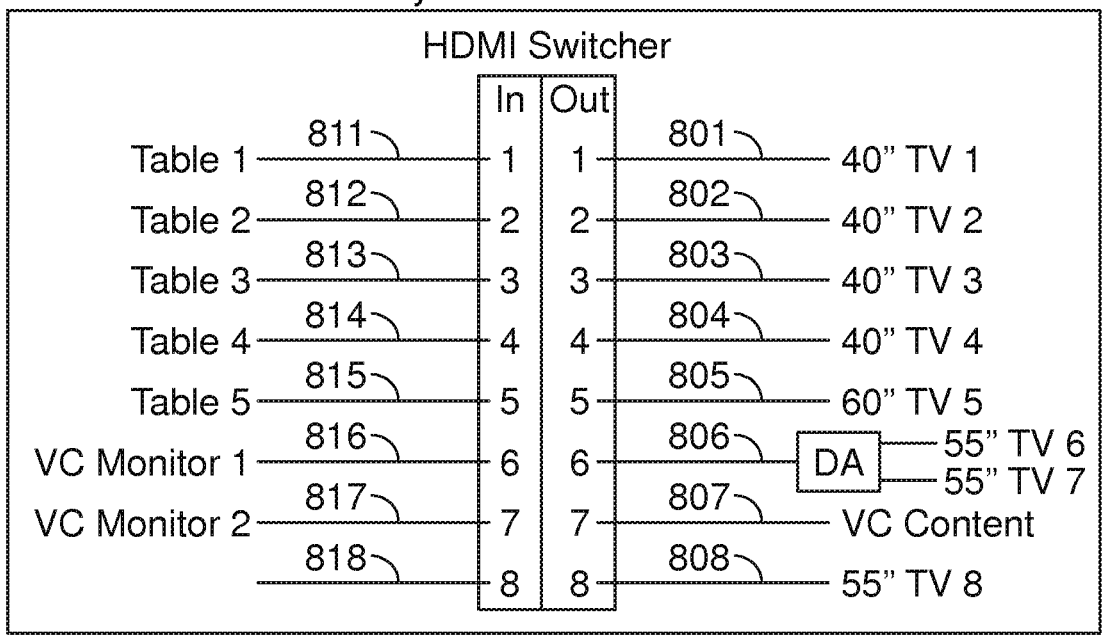
FIG. 8 illustrates another example of the various system components and connections that may be used in a connected classroom.

FIG. 8 provides an illustration of an HDMI switch 602 in greater detail, where the switch may accept eight input streams 811-818 and support eight output streams 801-808. The input streams 811-818 provided to HDMI switch 602 may include HDMI inputs 811-815 from faceplates at the table and monitor streams 816,817 from VC unit 235, which may correspond to streams captured from cameras 230a, 230b. With reference to FIG. 12, the HDM inputs 811-815 may be provided from laptops 1211-1215 provided through faceplates 1221-1225 at a table 210.

Figure 7:
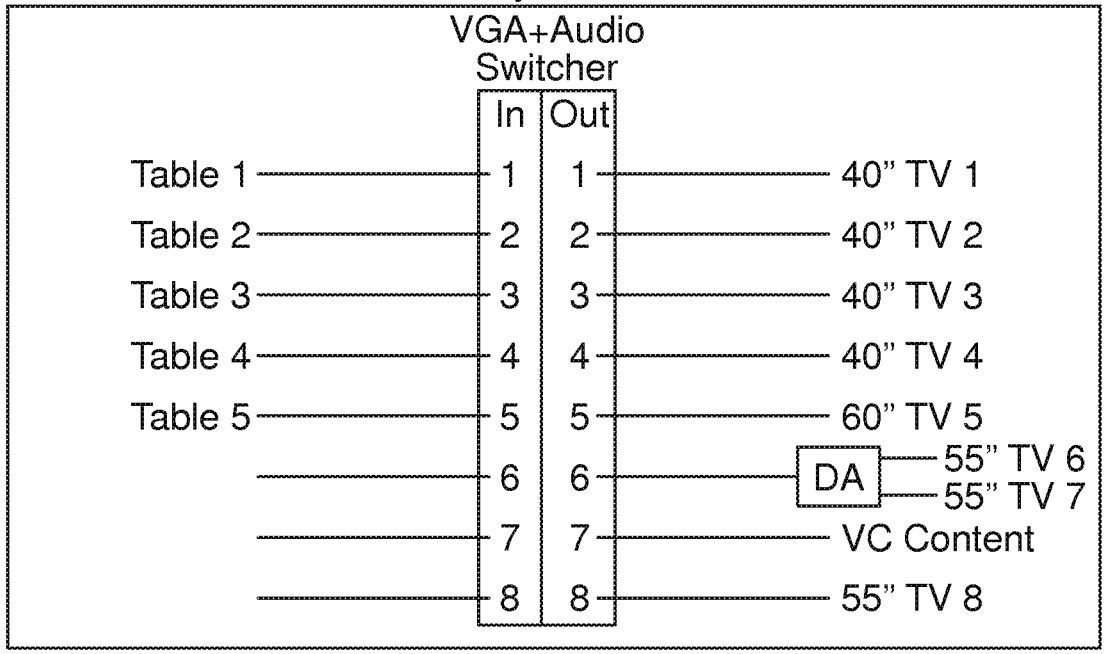
FIG. 7 illustrates another example of the various system components and connections that may be used in a connected classroom.

The output streams 801-808 may include streams 801-805,808 provided directly to HD displays 240 and interactive display 250, streams 816 provided to a distribution amplifier 836 which may replicate the video stream on multiple HD displays 240. The output stream may also include content streams 817 provided to the VC unit 235. With reference to FIG. 12, the streams 801-804,808 may be provided to an HDMI transmitter 1231-1234,1238 (e.g., DXLink HDMI Transmitter Module, AVB-TX-HDMI-DX-LINK) which may communicate with an HDMI receiver 1241-1244,1248 (e.g., DXLink HDMI Receiver Module, AVB-RX-DXLINK-HDMI) in connection with HD displays. An output stream 805 is provided directly to the interactive display 250, and an output stream 806 is provided to distribution amplifier 836 (e.g., Kramer HDMI Distribution Amplifier), which may replicate the signal and provide it to HD displays or by using an HDMI transmitter 1235 and HDMI receiver 1245. FIGS. 7 and 11 provide a more detailed illustration of a matrix video switcher 604 that is similar to the description of HDMI switch 602 just provided with reference to FIGS. 8 and 12.

Figure 9:
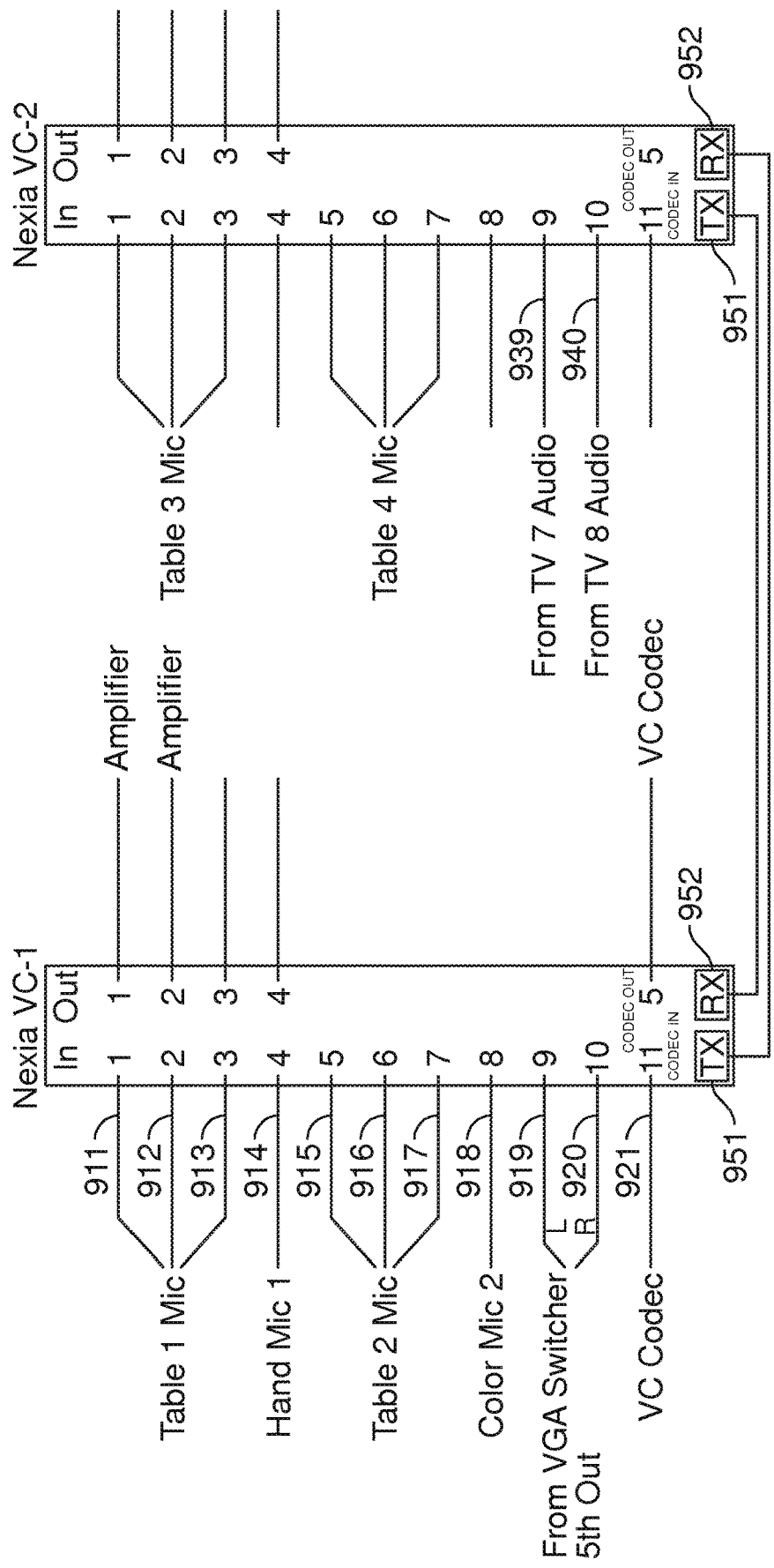
FIG. 9 illustrates another example of the various system components and connections that may be used in a connected classroom.
Figure 10:
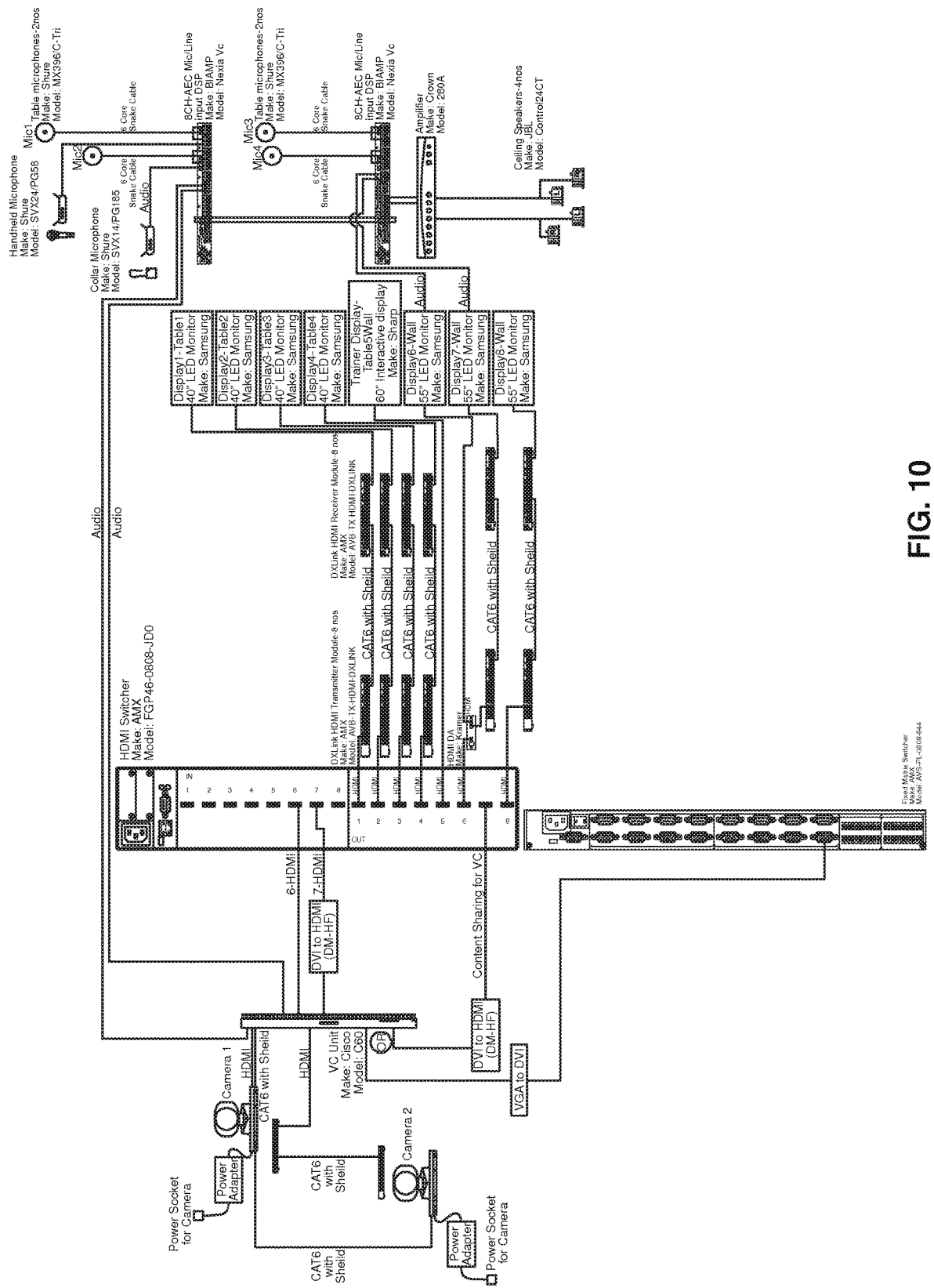
FIG. 10 illustrates another example of the various system components and connections that may be used in a connected classroom.
Figure 10A:
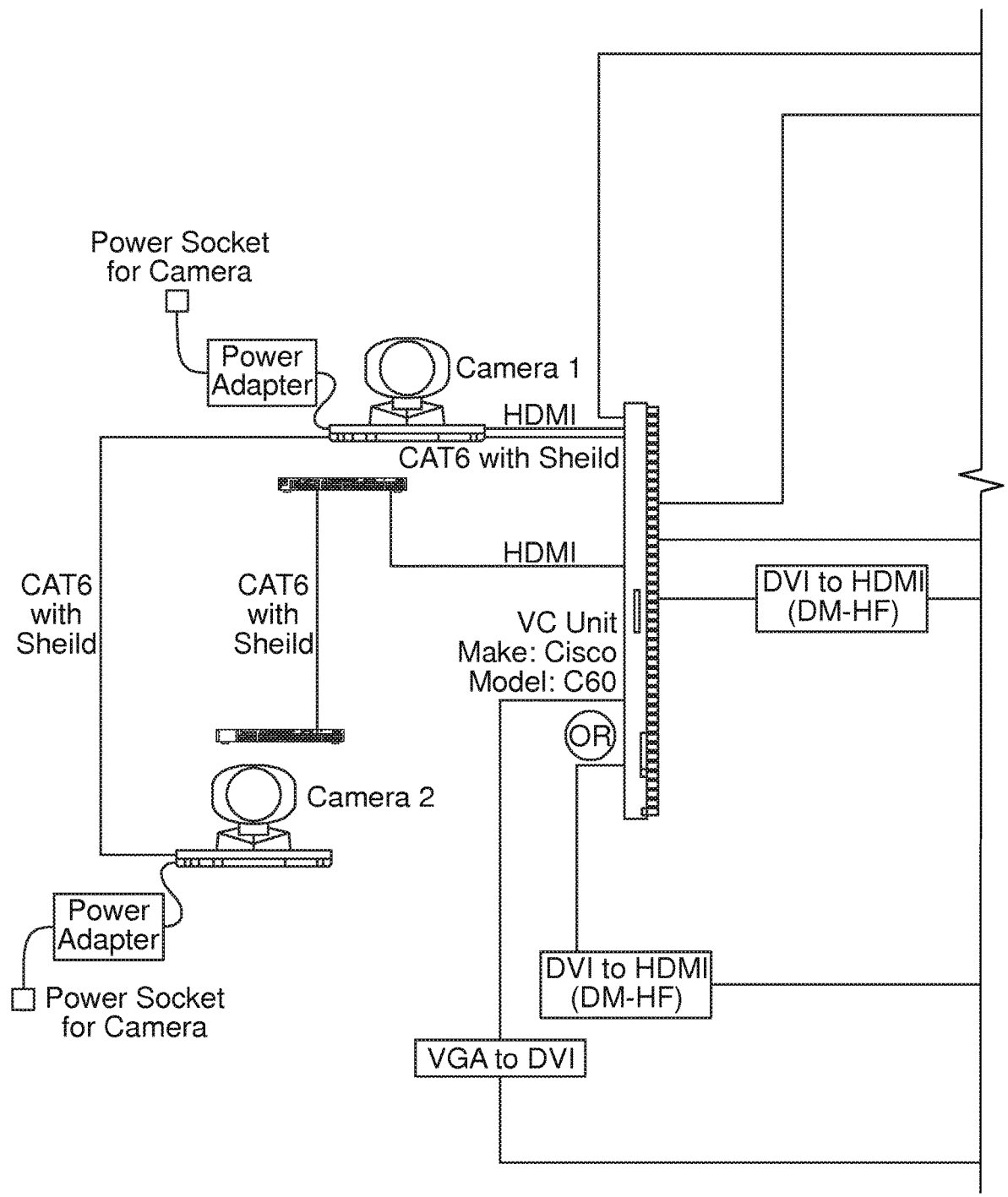
FIG. 10A illustrates another example of the various system components and connections that may be used in a connected classroom.

Also as illustrated in FIG. 12 and FIG. 9, the HD displays may be in communication with an audio mixer 1216, for example, providing input audio streams 939, 940. The audio mixer 1216 may be in communication with other audio mixers 1217, over transmit 951 and receive channels 952, and amplifiers 1218 (e.g., Crown 280A Amplifier). The audio mixers 1217 may have various input data streams 911-921, including an instructor 130 collar microphone 1241 (e.g., Shure SVX14/PG185) providing input data stream 918, a handheld microphone 1242 (e.g., Shure SVX24/PG58) providing input data stream 914, and table microphones 220 (e.g., Shure MX396/C-Tri) each providing three input data streams 911-913, 915-917, 931-933, 935-937. The audio mixer 1217 may provide an output data stream to amplifier 1218, which may be connected to a set of ceiling speakers 223 (e.g., JBL Ceiling Speakers, Control24CT) within the classroom 110.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system for providing a collaborative teaching experience in a classroom environment having a defined layout, the system comprising:
   presenter interface circuitry;
   participant interface circuitry of a participant media device; and
   a controller coupled between the presenter interface circuitry and the participant interface circuitry, the controller configured to operate according to a plurality of presentation modes, each presentation mode defining an operating configuration for coordinated control of one or more input devices and one or more output devices, wherein the one or more input devices includes a plurality of cameras and a plurality of microphones, where the controller is configured to:
      receive, from an input mechanism coupled to the participant interface circuitry, a first control input and a second control input, wherein the first control input and the second control input respectively comprise one of a plurality of different interactive control values;
      receive a first media stream including audio data captured by a first microphone from the plurality of microphones and video data captured by a first camera from the plurality of cameras;
      activate, based on a first interactive control value of the first control input, a second camera with a field of view covering the input mechanism;
      control, based on the first interactive control value of the first control input, operation of a second microphone to activate;
      receive a second media stream including a second audio data captured by the second microphone and a second video data captured by the second camera;
      modify at least one of a resolution or frame rate of the second media stream based on a network attribute of a network connecting the one or more output devices including at least one of a network bandwidth or network latency;
      control transmission of the second media stream to a respective output device;
      switch between a first presentation mode of the plurality of presentation modes to a second presentation mode of the plurality of presentation modes based on a second interactive control value of the second control input, wherein the second presentation mode pushes media content from the participant media device coupled to the input mechanism to a remote participant media device, wherein the remote participant media device is included in the one or more output devices; and
      control a camera pan and a camera zoom of the second camera to adjust to a preprogrammed camera pan setting and a preprogrammed camera zoom setting according to the second presentation mode that captures the participant media device coupled to the input mechanism.

2. The system of claim 1, where the operating configuration for each presentation mode further provides for coordinated control of the remote participant media device.

3. The system of claim 1 further comprising:
   the remote participant media device configured to provide presentation mode inputs to the controller and render the second media stream received from the controller; and enterprise messaging circuitry operable to provide an enterprise messaging platform that enables real-time communication between a plurality of remote participant media devices, where the controller is coupled to the enterprise messaging circuitry and is operable to provide enhanced interaction via an interactive display of the remote participant media device.

4. The system of claim 1 where the controller through the presenter interface circuitry is configured to adjust the first camera to capture a presentation staging area and the second camera to capture a participant viewing area.

5. The system of claim 1 where the presenter interface circuitry comprises a tablet control interface, and the input mechanism is a button coupled to the tablet control interface.

6. The system of claim 5 where the controller, responsive to presentation mode inputs received via the tablet control interface, selectively enables or disables the one or more input devices and output devices.

7. The system of claim 1 where the controller is operable to provide real-time notifications regarding the one or more input devices.

8. The system of claim 1, wherein at least one of the first and the second control inputs comprises a button and one of the first and second interactive control values from the at least one of the first and second control inputs comprises values corresponding to a short press of the button, a long press of the button, or multiple presses of the button.

9. The system of claim 8, wherein an action by the system in response to the at least one of the first and second control inputs requires validation by receiving a subsequent input from the other of the at least one of the first and second control inputs.

10. A method for providing a collaborative teaching experience in a classroom environment having a defined layout; the method comprising:
receiving presentation mode inputs from one or more input devices at a controller via a presenter interface circuitry, wherein the one or more input devices includes a plurality of cameras and a plurality of microphones;
receiving a first media stream including audio data captured by a first microphone and video data captured by a first camera;
receiving, from an input mechanism coupled to a participant interface circuitry, a first control input and a second control input, wherein the first control input and the second control input respectively comprise one of a plurality of different interactive control values;
activating, based on a first interactive control value of the first control input, a second camera with a field of view covering the input mechanism;
controlling, based on the first interactive control value of the first control input, operation of a second microphone to activate;
receiving a second media stream including a second audio data captured by the second microphone and a second video data captured by the second camera;
modifying, by the controller, at least one of a resolution or frame rate of the second media stream based on a network attribute of a network connecting one or more output devices including at least one of a network bandwidth or network latency;
controlling, by the controller, transmission of the second media stream to a respective output device;
switching operation of the controller from a first presentation mode to a second presentation mode based on a second interactive control value of the second control input, wherein the second presentation mode pushes media content from a participant media device coupled to the input mechanism to a remote participant media device, wherein the remote participant media device is included in the one or more output devices; and
controlling a camera pan and a camera zoom of the second camera to adjust to a preprogrammed camera pan setting and a preprogrammed camera zoom setting according to the second presentation mode that captures the participant media device coupled to the input mechanism.

11. The method of claim 10 wherein an operating configuration of each presentation mode provides coordinated control of the remote participant device.

12. The method of claim 10 further comprising:
adjusting the first camera having a first field of view to capture a presentation staging area; and
adjusting the second camera having a second field of view to capture a participant viewing area.

13. The method of claim 10 where the input mechanism is a button coupled to a tablet control interface.

14. The method of claim 10 further comprising:
providing real-time notifications regarding the one or more input devices to a tablet control interface via an enterprise messaging platform; and
selectively enabling or disabling the one or more input devices via the tablet control interface responsive to presentation mode inputs received via the tablet control interface.

15. The system of claim 10, wherein at least one of the first and the second control inputs comprises a button and one of the first and second interactive control values from the at least one of the first and second control inputs comprises values corresponding to a short press of the button, a long press of the button, or multiple presses of the button.

16. A system for providing a collaborative teaching experience in a classroom environment having a defined layout, the system comprising:
a controller coupled to a presenter interface circuitry and a participant interface circuitry, the controller being configured to
receive, from an input mechanism coupled to the participant interface circuitry, a first control input and a second control input, wherein the first control input and the second control input respectively comprise one of a plurality of different interactive control values;
receive a first media stream including audio data captured by a first microphone and video data captured by a first camera;
activate, based on a first interactive control value of the first control input, a second camera with a field of view coveting the input mechanism;
control, based on the first interactive control value of the first control input, operation of a second microphone to activate;
receive a second media stream including a second audio data captured by the second microphone and a second video data captured by the second camera;
modify at least one of a resolution or frame rate of the second media stream based on a network attribute of a network connecting one or more output devices including at least one of a network bandwidth or network latency;
control transmission of the second media stream to a respective output device;

switch between a first presentation mode and a second presentation mode based on a second interactive control value of the second control input, wherein the second presentation mode pushes media content from a participant media device coupled to the input mechanism to a remote participant media device; and control a camera pan and a camera zoom of the second camera to adjust to a preprogrammed camera pan setting and a preprogrammed camera zoom setting according to the second presentation mode that captures the participant media device coupled to the input mechanism.

17. The system of claim 16, the controller being further configured to;

control, according to the second presentation mode; the first camera having a first field of view to capture a presentation staging area; and control, according to the second presentation mode, the second camera having a second field of view to capture a participant viewing area.

18. The system of claim 16 wherein the remote participant media device is configured to provide presentation mode inputs to the controller and render the second media stream received from the controller; and wherein the system further comprises: enterprise messaging circuitry operable to provide an enterprise messaging platform that enables real-time communication between a plurality of remote participant media devices, where the controller is coupled to the enterprise messaging circuitry and is operable to provide enhanced interaction an interactive display of the remote participant media device.

19. The system of claim 16 where the presenter interface circuitry comprises a tablet control interface, and the input mechanism is a button coupled to the tablet control interface.

20. The system of claim 16, wherein at least one of the first and the second control inputs comprises a button and one of the first and second interactive control values from the at least one of the first and second control inputs comprises values corresponding to a short press of the button, a long press of the button, or multiple presses of the button.

* * * * *

UNITED STATES PATENT AND TRADEMARK OFFICE
CERTIFICATE OF CORRECTION

PATENT NO. : 10,691,398 B2
APPLICATION NO. : 14/838135
DATED : June 23, 2020
INVENTOR(S) : Lisa Kay DeMik et al.

It is certified that error appears in the above-identified patent and that said Letters Patent is hereby corrected as shown below:

In the Specification

In Column 3, Line 14, delete "10" and insert in its place --IO--.

In the Claims

In Column 15, Claim 9, Lines 31-32, delete "other of the at least one of the first and second control inputs" and insert in its place --presenter interface circuitry--.

In Column 15, Claim 10, Line 35, delete ";" after "layout" and insert in its place --,--.

In Column 16, Claim 16, Line 54, delete "coveting" and insert in its place --covering--.

In Column 17, Claim 17, Line 15, delete ";" after "mode" and insert in its place --,--.

Signed and Sealed this
Fifteenth Day of September, 2020

Andrei Iancu
*Director of the United States Patent and Trademark Office*